United States Patent
Ukuda

(10) Patent No.: US 7,046,445 B2
(45) Date of Patent: May 16, 2006

(54) OPTICAL MATERIAL, AND OPTICAL ELEMENT, OPTICAL SYSTEM, AND LAMINATE TYPE DIFFRACTION OPTICAL ELEMENT, WHICH ARE MADE OF OPTICAL MATERIAL

(75) Inventor: Hideo Ukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 10/649,632

(22) Filed: Aug. 28, 2003

(65) Prior Publication Data

US 2004/0042102 A1    Mar. 4, 2004

(30) Foreign Application Priority Data

Aug. 30, 2002    (JP) ............................. 2002-254712
Jul. 17, 2003    (JP) ............................. 2003-198460

(51) Int. Cl.
*G02B 5/18* (2006.01)
*C08K 3/22* (2006.01)

(52) U.S. Cl. ...................................... 359/576; 524/497

(58) Field of Classification Search ................ 359/565, 359/566, 576; 524/497, 492; 349/112
See application file for complete search history.

(56) References Cited

U.S. PATENT DOCUMENTS

| | | | | |
|---|---|---|---|---|
| 3,914,129 A | 10/1975 | Wylot et al. | ............... | 106/47 Q |
| 5,048,925 A | 9/1991 | Gerritsen et al. | ............ | 359/569 |
| 5,847,877 A * | 12/1998 | Imamura et al. | ............ | 359/566 |
| 6,061,110 A | 5/2000 | Hisatake et al. | ............ | 349/113 |
| 6,144,502 A | 11/2000 | Hayakawa et al. | ......... | 359/726 |
| 6,157,488 A | 12/2000 | Ishii | ........................ | 359/569 |
| 6,188,522 B1 | 2/2001 | Kimura et al. | .............. | 359/649 |
| 6,262,846 B1 | 7/2001 | Nakai | .......................... | 359/576 |
| 6,381,079 B1 | 4/2002 | Ogawa | ........................ | 359/795 |
| 6,480,332 B1 | 11/2002 | Nakai | .......................... | 359/566 |
| 6,606,200 B1 | 8/2003 | Nakayama et al. | ......... | 359/686 |
| 6,759,471 B1 * | 7/2004 | Ukuda | ......................... | 524/497 |
| 6,778,240 B1 * | 8/2004 | Nakamura et al. | .......... | 349/112 |
| 2001/0015848 A1 | 8/2001 | Nakai | .......................... | 359/565 |
| 2003/0231396 A1 | 12/2003 | Nakai | .......................... | 359/569 |
| 2004/0051949 A1 * | 3/2004 | Ukuda | ......................... | 359/576 |
| 2005/0190459 A1 | 9/2005 | Ukuda | ......................... | 359/708 |

FOREIGN PATENT DOCUMENTS

| | | |
|---|---|---|
| EP | 0 895 099 A2 | 2/1999 |
| EP | 1 065 531 A2 | 1/2001 |
| JP | 3-191319 | 8/1991 |

(Continued)

OTHER PUBLICATIONS

Michael W. Farn et al., "Diffractive Doublet Corrected On-Axis at Two Wavelengths," 1354 *SPIE* 24-29(1990).
Carmiña Londoño et al., "The Design of Achromated Hybrid Diffractive Lens Systems," 1354 *SPIE* 30-37 (1990).

(Continued)

*Primary Examiner*—Audrey Chang
(74) *Attorney, Agent, or Firm*—Fitzpatrick, Cella, Harper & Scinto

(57) ABSTRACT

To provide an optical element in which the diffraction efficiency in each use wavelength region within the entire visible region is preferable, and light beams of a specific order (design order) are sufficiently concentrated in the entire use wavelength region, by using an optical material in which the relationship between a refraction index $n_d$ and an Abbe number $v_d$ with respect to a "d" line is $n_d > -6.667 \times 10^{-3} v_d + 1.70$ and the Abbe number $v_d$ satisfies $v_d \leq 16$.

9 Claims, 34 Drawing Sheets

FOREIGN PATENT DOCUMENTS

| | | |
|---|---|---|
| JP | 9-127321 | 5/1997 |
| JP | 9-127322 | 5/1997 |
| JP | 11-44808 | 2/1999 |
| JP | 11-44810 | 2/1999 |
| JP | 2000-98118 | 4/2000 |

OTHER PUBLICATIONS

Ivan D. Nikolov et al., "Optical Plastic Refractive Measurements in the Visible and Near-Infrared Regions," 39(13) *Applied Optics* 2067-70 (May 2000).

* cited by examiner

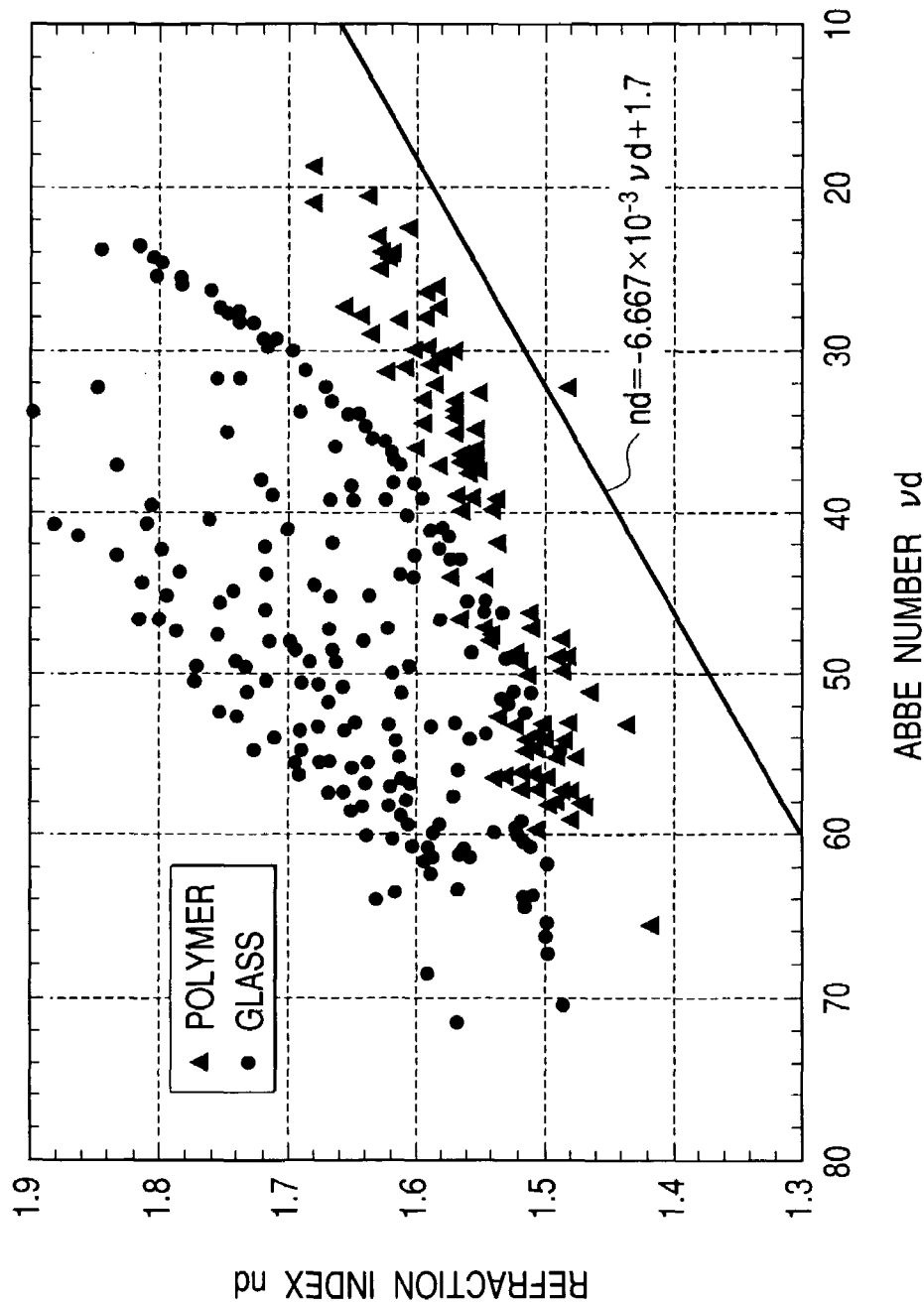

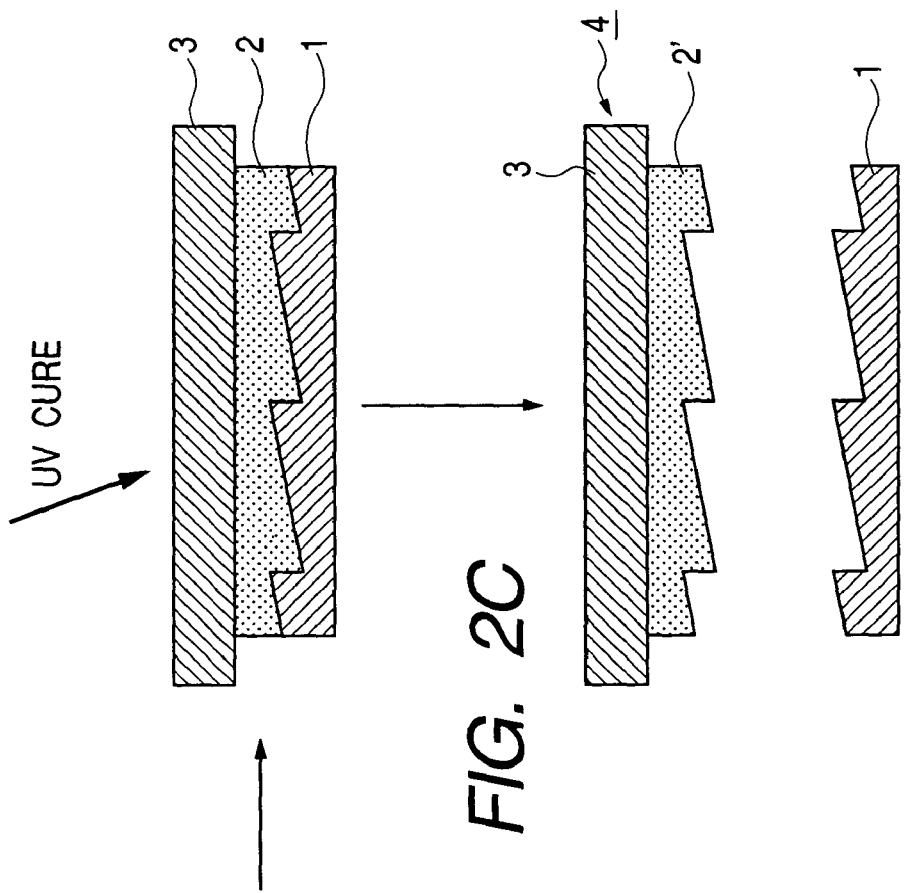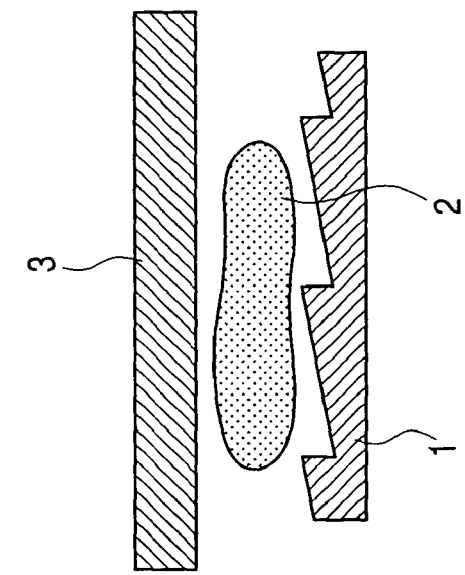

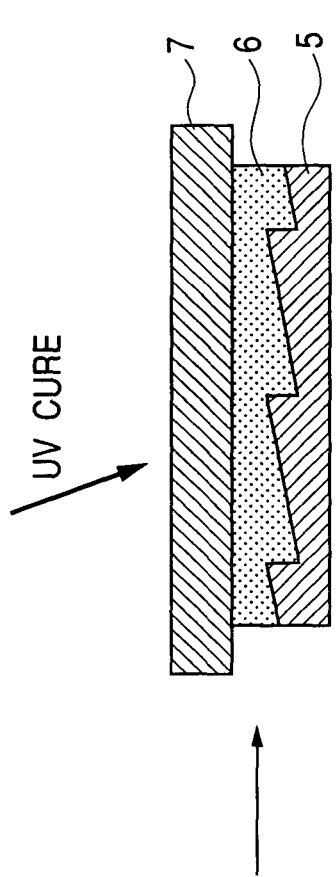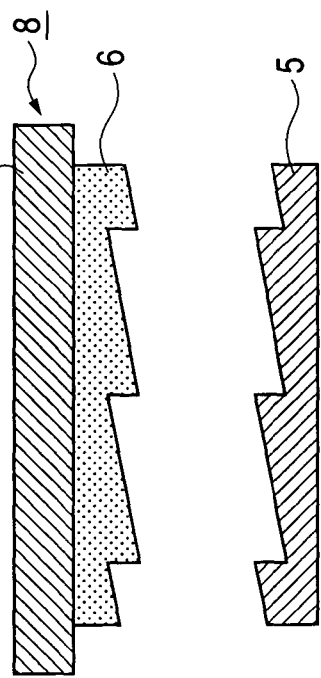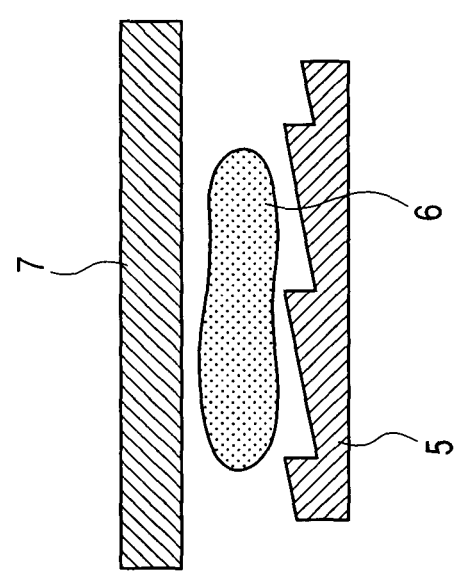

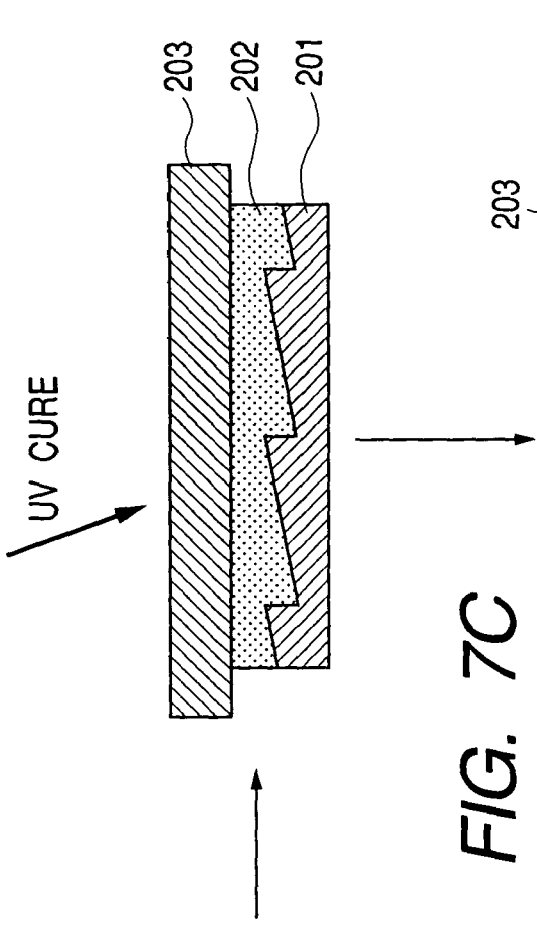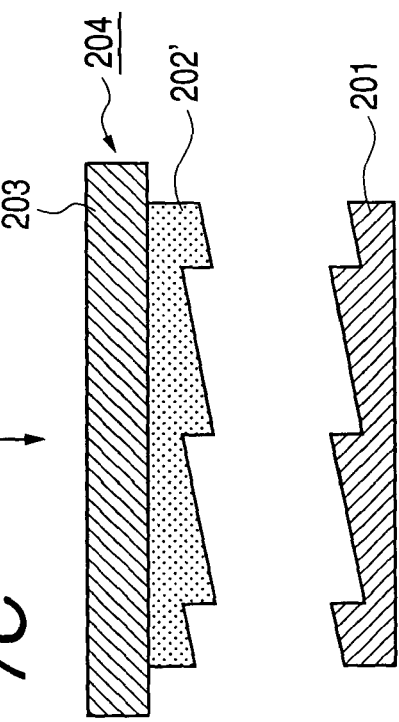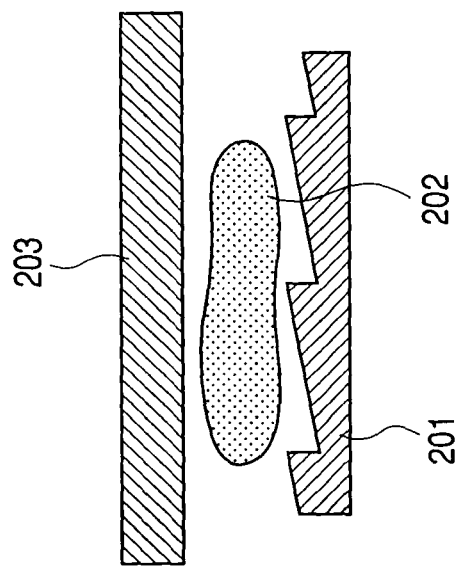

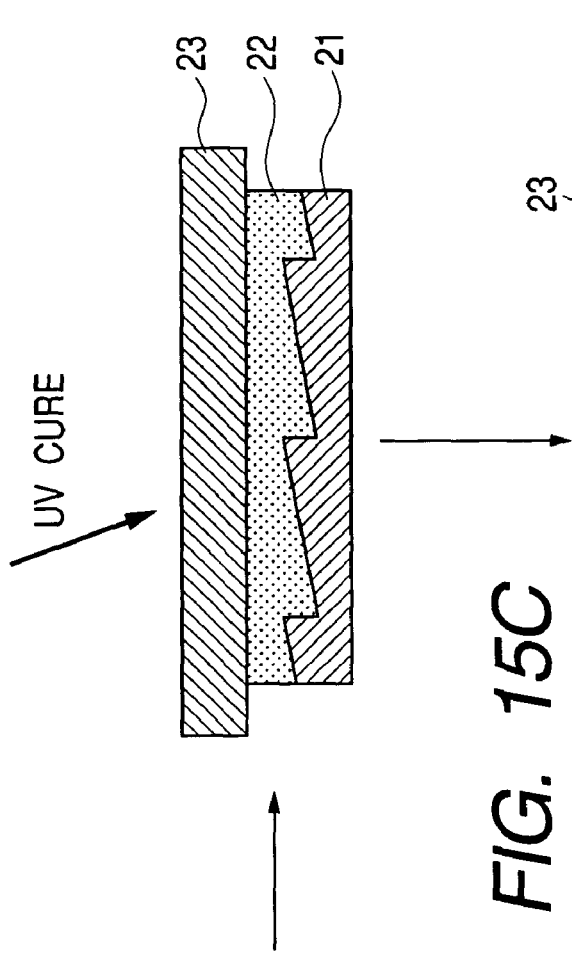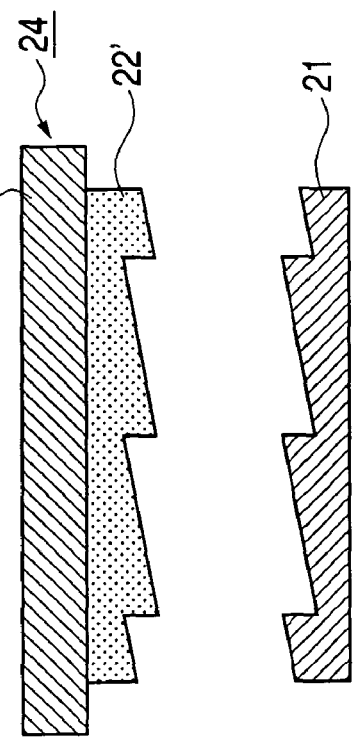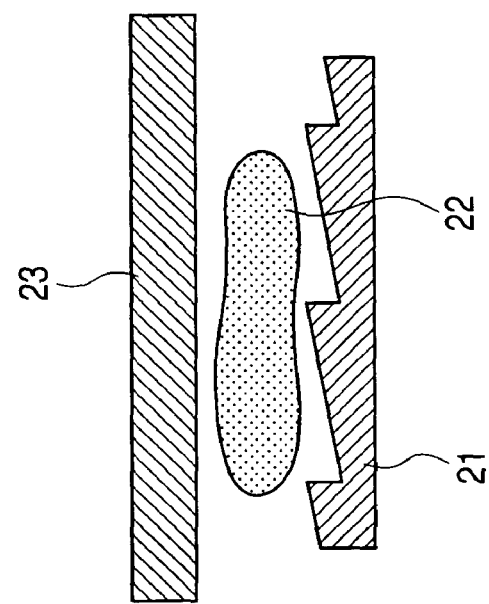

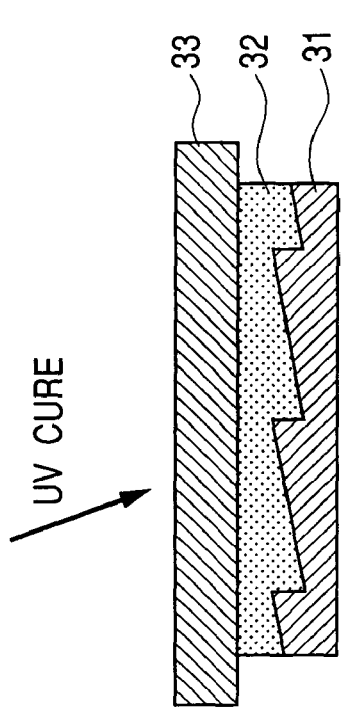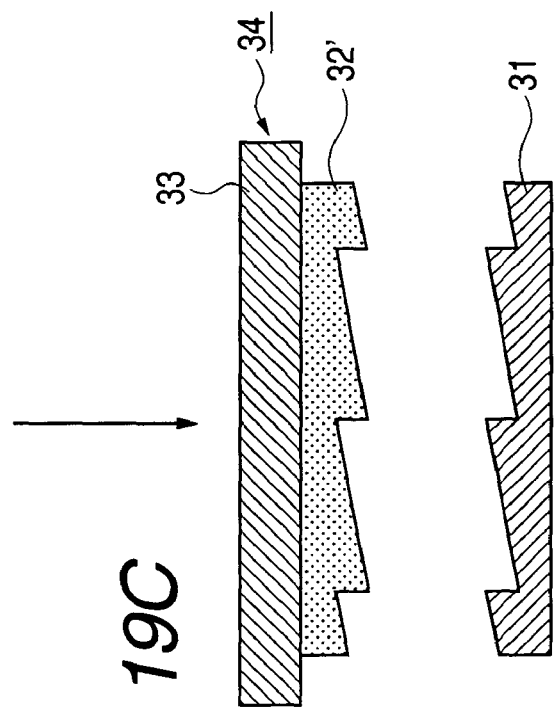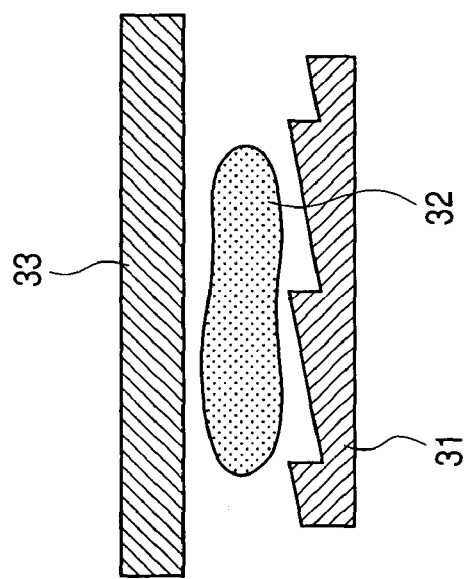

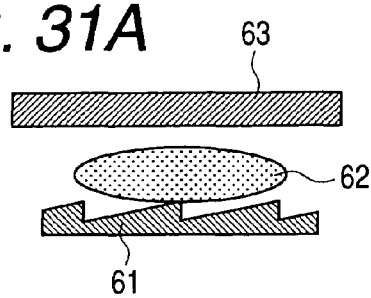
FIG. 31A
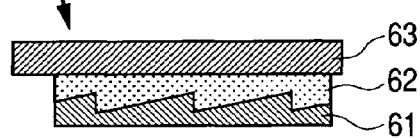
FIG. 31B
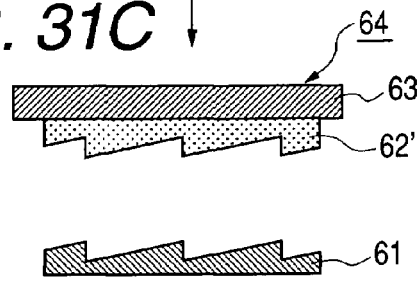
FIG. 31C
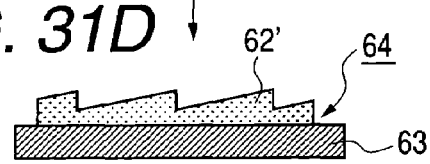
FIG. 31D
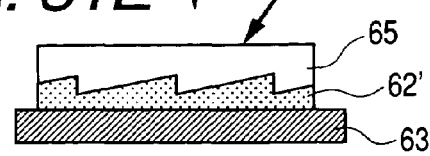
FIG. 31E
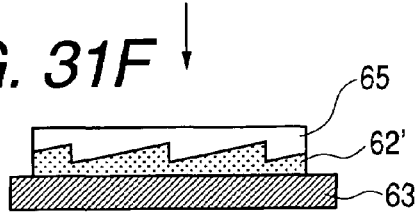
FIG. 31F
FIG. 31G
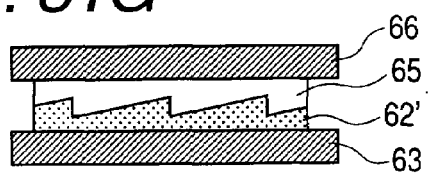
FIG. 31H
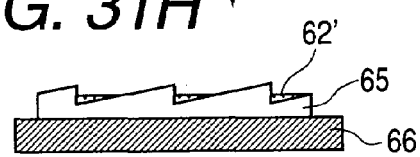
FIG. 31I
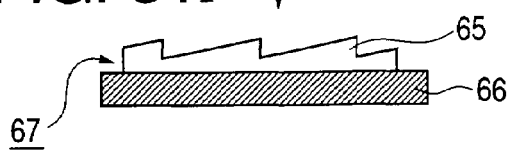

OPTICAL MATERIAL, AND OPTICAL ELEMENT, OPTICAL SYSTEM, AND LAMINATE TYPE DIFFRACTION OPTICAL ELEMENT, WHICH ARE MADE OF OPTICAL MATERIAL

BACKGROUND OF THE INVENTION

1. Field of the Invention

The present invention relates to an optical element used as a lens, a filter, or a mirror, and more particularly to a diffractive optical element and a refraction optical element, which are made of an optical material having a high refraction index dispersion.

2. Related Background Art

Until now, in refraction optical systems constructed by refraction of light only, glass materials having different dispersion characteristics have been combined with one another to reduce chromatic aberration. For example, in an objective lens of a telescope, a lens having a small dispersion is used as a positive lens, a lens having a large dispersion is used as a negative lens, and these lenses are combined with each other so that chromatic aberration caused on an axis is corrected. Therefore, in such a case, where a structure of lenses and a number of lenses are limited, or a case where the kinds of glass materials to be used are limited, it is very difficult to sufficiently correct the chromatic aberration.

Also, SPIE Vol. 1354, International Lens Design Conference (1990), discloses a method of reducing chromatic aberration by using a diffractive optical element having a diffraction grating on a lens surface or in a part of an optical system. This method uses a physical phenomenon in which a direction in a refraction surface of an optical element, in which chromatic aberration with respect to a light beam with a reference wavelength is caused, becomes opposite to a direction in a diffraction surface thereof. Further, according to such a diffractive optical element, in the case where a cycle of a cyclic structure of the diffraction grating is changed, the same effect as an aspherical lens can be provided. Accordingly, this method is extremely effective in reducing the chromatic aberration.

Now, the diffraction action of a light beam will be described. In general, a light beam incident onto a spherical lens and an aspherical lens, which are used as optical elements of a refraction system, becomes one light beam after being refracted on the spherical and aspherical surfaces of the lenses. In contrast to this, a light beam incident onto a diffractive optical element, which is used as an optical element of a diffraction system, is divided into a plurality of light beams of respective orders by the diffractive action of the element.

Accordingly, in order to make full use of a diffractive optical element in the optical system, it is necessary to concentrate light fluxes of a use wavelength region on a specific order (hereinafter referred to as a design order). When the light fluxes of the use wavelength region are concentrated on the specific order, the intensities of diffraction light beams of other diffraction orders become very low. Therefore, it is not possible to image flare light such that the light beam other than the design order is imaged in a location different from an imaging location of the light beam of the design order.

A grating structure of a diffraction grating, which is determined in advance so as to concentrate light fluxes of a use wavelength region on the specific order, thereby sufficiently improving diffraction efficiency, is disclosed in Japanese Patent Application Laid-Open Nos. 09-127321, 09-127322, 11-044808, and 11-044810. According to these publications, a plurality of optical elements are combined with one another to produce a laminate type optical element, which is constructed so as to have high diffraction efficiency in a wide wavelength region by optimally selecting refraction index dispersions of the respective optical elements and shapes of gratings formed in interfaces of the optical elements. More specifically, a plurality of optical materials are laminated on a substrate, and a relief pattern, a step shape, a kinoform, or the like is formed in at least one of their interfaces, thereby producing a desirable diffractive optical element.

According to these prior patent publications, in order to obtain the structure having the high diffraction efficiency in the wide wavelength region, a material with a relatively low refraction index dispersion and a material with a relatively high refraction index dispersion are combined with each other. More specifically, in Japanese Patent Application Laid-Open No. 09-127321, BMS81 ($n_d$=1.64 and $v_d$=60.1: produced by Ohara Incorporated) is used as the material with the low refraction index dispersion. A plastic optical material PC ($n_d$=1.58 and $v_d$=30.5: produced by Teijin Chemicals Ltd.) is used as the material with the high refraction index dispersion. Similarly, in Japanese Patent Application Laid-Open No. 09-127322, LaL14 ($n_d$=1.698 and $v_d$=55.5: produced by Ohara Incorporated), an acrylic resin ($n_d$=1.49 and $v_d$=57.7), or Cytop ($n_d$=1.34149 and $v_d$=93.8: produced by Asahi glass Co., Ltd.) is used as the material with the low refraction index dispersion. The plastic optical material PC ($n_d$=1.58 and $v_d$=30.5: produced by Teijin Chemicals Ltd.) is used as the material with the high refraction index dispersion. In Japanese Patent Application Laid-Open No. 11-044808 and Japanese Patent Application Laid-Open No. 11-044810, C001 ($n_d$=1.525 and $v_d$=50.8: produced by Dainippon Ink and Chemicals, Incorporated), PMMA ($n_d$=1.4917 and $v_d$=57.4), or BMS81 ($n_d$=1.64 and $v_d$=60.1: produced by Ohara Incorporated) is used as the material with the low refraction index dispersion. The plastic optical material PC ($n_d$=1.58 and $v_d$=30.5: produced by Teijin Chemicals Ltd.), PS ($n_d$=1.5918 and $v_d$=31.1), or the like is used as the material with the high refraction index dispersion.

FIG. 1 is a graph showing Abbe numbers and refraction indexes of materials commercially available as optical materials. In FIG. 1, the ordinate indicates a refraction index nd and the abscissa indicates an Abbe number d. The optical materials described in Japanese Patent Application Laid-Open Nos. 09-127321, 09-127322, 11-044808, and 11-044810 as discussed above, are included in FIG. 1. As is apparent from FIG. 1, the refraction index of a general optical material satisfies nd>$-6.667\times10^{-3}v_d$+1.70. It should be noted that a straight line shown in the drawing indicates nd=$-6.667\times10^{-3}v_d$+1.70.

According to the structure of the multilayer diffractive optical element, as a difference in refraction index dispersion between the material with the high refraction index dispersion and the material with the low refraction index dispersion increases, the diffraction efficiency of the constructed optical element increases, and the angle of view of the optical element becomes wider. In addition, in order to further improve the diffractive optical element, it is necessary to use a material with a higher refraction index dispersion (small Abbe number). By using such a material, chromatic aberration can be corrected with further accuracy. Of the optical materials of organic polymers as shown in FIG.

1, a material with a minimum Abbe number is polyvinylcarbazole (PVCZ) with an Abbe number of 17.3.

However, in recent years, the optical characteristic requirements of the optical element have become more stringent. Accordingly, in the case where light fluxes of a use wavelength region in the diffractive optical element are concentrated on the design order to improve diffraction efficiency, not only is it required that the diffraction efficiency in a use wavelength region (400 nm to 700 nm) be set to 95% or more by using the material with the high refraction index dispersion and the material with the low refraction index dispersion, but it is also required that an optical characteristic in which a light loss rate at an incident angle of 10° is 3.40% or less. In the case of polyvinylcarbazole (PVCZ) with an Abbe number of 17.3, as described below in Comparative Example 1, the diffraction efficiency in the use wavelength region (400 nm to 700 nm) is 95% or more. However, PVCZ does not satisfy the requirement that the light loss rate at the incident angle of 10° is 3.40% or less. That is, light fluxes of the use wavelength region cannot be concentrated on the specific order to achieve desirable high diffraction efficiency.

SUMMARY OF THE INVENTION

An object of the present invention is to provide an optical element made of an optical material, in which a refraction index $n_d$ satisfies $n_d > -6.667 \times 10^{-3} v_d + 1.70$ and an Abbe number $v_d$ satisfies $v_d \leq 16$, so that diffraction efficiency in the entire visible region is improved, a light loss rate of an intensity of primary diffraction light at each incident angle is small, and light fluxes of a use wavelength region are concentrated on a specific order.

Therefore, in the present invention, in order to achieve the object, there are provided an optical material in which a relationship between a refraction index $n_d$ and an Abbe number $v_d$ with respect to a "d" line is $n_d > -6.667 \times 10^{-3} v_d + 1.70$, and the Abbe number $v_d$ satisfies $v_d \leq 16$; and an optical element made of the optical material.

Also, according to the present invention, there is provided a laminate type diffractive optical element comprising: a first diffractive optical element made of an optical material in which a relationship between a refraction index $n_d$ and an Abbe number $v_d$ with respect to a "d" line is $n_d > -6.667 \times 10^{-3} v_d + 1.70$, and the Abbe number $v_d$ satisfies $v_d \leq 16$, in which one surface is a diffraction surface with a diffracting shape; and a second diffractive optical element in which the Abbe number is larger than that of the first diffractive optical element and one surface is a diffraction surface with a diffracting shape, the first diffractive optical element and the second diffractive optical element being disposed such that the diffraction surfaces thereof are opposed to each other.

Also, according to the present invention, there is provided a laminate type diffractive optical element which is composed of at least two layers, each of which is made of a different optical material, comprising: a first layer made of a first optical material in which a relationship between a refraction index $n_d$ and an Abbe number $v_d$ with respect to a "d" line is $n_d > -6.667 \times 10^{-3} v_d + 1.70$, and the Abbe number $v_d$ satisfies $v_d \leq 16$, in which one surface is a diffraction surface with a diffracting shape; and a second layer in which the Abbe number is larger than that of the first optical material and one surface is a diffraction surface with a diffracting shape.

Also, according to the present invention, there are provided an optical material and a laminate type diffractive optical element made of the optical material, the optical material being made from at least one inorganic substance selected from the group consisting of $TiO_2$, $Nb_2O_5$, $Cr_2O_3$, and $BaTiO_3$.

Also, according to the present invention, there are provided an optical material and a laminate type diffractive optical element made of the optical material, the optical material being a polymer containing an inorganic fine particle.

Also, according to the present invention, there are provided an optical material in which the polymer is polyvinylcarbazole and the inorganic fine particle is at least one selected from the group consisting of a $TiO_2$ fine particle, an $Nb_2O_5$ fine particle, a $Cr_2O_3$ fine particle, and a $BaTiO_3$ fine particle; and a laminate type diffractive optical element made of the optical material.

Also, according to the present invention, there are provided an optical material in which a size of the inorganic fine particle is 2 nm to 100 nm, and a laminate type diffractive optical element made of the optical material.

Also, according to the present invention, there is provided a diffractive optical element in which a surface of the optical element is a diffraction surface with a diffracting shape.

Also, according to the present invention, there is provided an optical system comprising the laminate type diffractive optical element.

Also, according to the present invention, there is provided an optical system such as a projection optical system and a photographing optical system.

The above and other objects of the Invention will become more apparent from the following details taken in conjunction with the accompanying drawings.

BRIEF DESCRIPTION OF THE DRAWINGS

FIG. 1 is a graph showing a distribution of Abbe numbers and refraction indexes in general optical materials;

FIGS. 2A, 2B and 2C are sectional views showing a process of forming an optical element according to Example 1;

FIGS. 3A, 3B and 3C are sectional views showing the process of forming the optical element according to Example 1;

FIGS. 7A, 7B and 7C are sectional views showing a process of forming an optical element according to Comparative Example 1;

FIGS. 15A, 15B and 15C are sectional views showing a process of forming an optical element according to Example 3;

FIGS. 19A, 19B and 19C are sectional views showing a process of forming an optical element according to Example 4;

FIGS. 31A, 31B, 31C, 31D, 31E, 31F, 31G, 31H, and 31I are sectional views showing a process of forming an optical element according to Example 7;

DESCRIPTION OF THE PREFERRED EMBODIMENTS

First Embodiment

Figure 4:
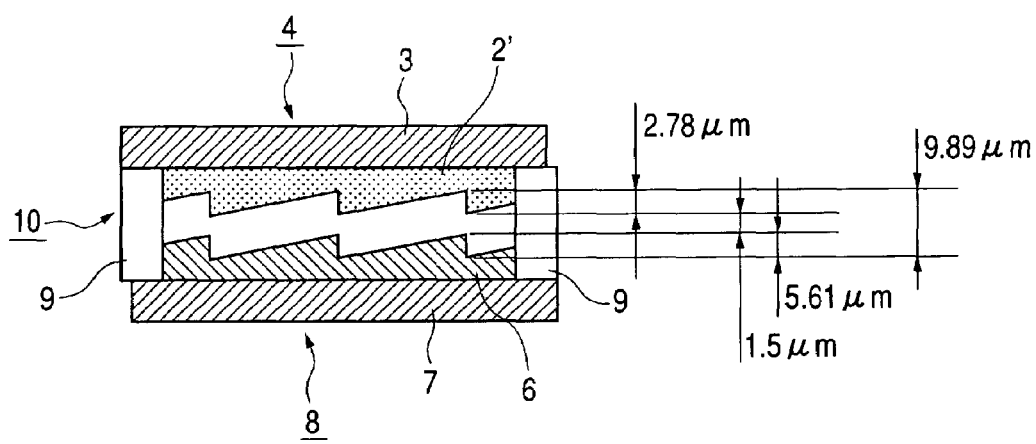
FIG. 4 is a sectional view showing a structure of a multilayer diffractive optical element according to Example 1.

The inventor of the present invention studied whether or not an optical material having a small Abbe number can be produced by containing in an optical material such as a polymer a fine particle of an inorganic oxide which is not generally used for an optical material and has a small Abbe number. $TiO_2$ ($n_d$=2.2652 and $v_d$=11.8), $Nb_2O_5$ ($n_d$=2.367 and $v_d$= 14.0), ITO ($n_d$=1.8581 and $v_d$=5.53), $Cr_2O_3$ ($n_d$=2.2178 and $v_d$=13.4), or $BaTiO_3$ ($n_d$=2.4362 and $v_d$=11.3) can be used as the inorganic oxide having the small Abbe number.

Each of these inorganic oxides is generally a material composing an antireflection film and used at a film thickness of 50 nm to 500 nm in many cases. However, in the case where a shape is formed by vacuum film formation, the inorganic oxide can be used for a diffractive optical element having a thickness of 50 nm or less. In addition, an optical material can be very easily produced by a combination with a commercially available UV curable resin as a host polymer. Further, a shape can be easily formed, so that the application to a refraction optical element and a diffractive optical element is easy.

Also, in the case where an inorganic oxide is used, it is desirable that a particle size thereof is 2 nm to 100 nm. If the particle size becomes larger than 100 nm, light scattering of a mixture becomes larger, and the inorganic oxide cannot be used for an optical element. On the other hand, if the particle size becomes smaller than 2 nm, a quantum effect on the surface becomes larger, and a characteristic of the inorganic oxide is not exhibited.

Also, polyvinylcarbazole in which fine particles can be mixed and uniformly dispersed is most preferable as a polymer containing an inorganic oxide. The polyvinylcarbazole containing the inorganic oxide is obtained by curing N-vinylcarbazole to which an inorganic oxide particle is added. Note that the polymer containing the inorganic oxide is not limited to the polyvinylcarbazole and may be an optical material in which $n_d > -6.667 \times 10^{-3} v_d + 1.70$ and $v_d \leq 16$ are satisfied. In addition, in the case where an Abbe number is set to satisfy $v_d \leq 16$, the number of openings in the optical element can be increased and the optical element can be made thinner. Therefore, the above-mentioned inorganic oxide can be more easily used as the optical material.

EXAMPLE 1

Referring to FIGS. 2A to 2C, FIGS. 3A to 3C, FIG. 4, FIG. 5, and FIG. 6, a structure of a laminate type diffractive optical element and a manufacturing method thereof according to Example 1 will be described. First, 12 g of N-vinylcarbazole (produced by Tokyo Kasei Kogyo Co., Ltd.) and 0.15 g of 1-hydroxy-cyclohexyl-phenyl-ketone as a photoinitiator are added to 100 g of chloroform solution in which $TiO_2$ fine particles having an average particle size of 10 nm were dispersed at 10 w %, and then chloroform was removed by reducing a pressure to produce an optical raw material 2.

Next, as shown in FIG. 2A, the optical raw material 2 was supplied to a mold 1 formed in a diffraction grating shape. Then, as shown in FIG. 2B, a glass (BK7) plate 3 was put on the optical raw material 2 and UV irradiation was conducted at 20000 mJ/cm² (100 mW/cm², 200 seconds) by a UV exposure machine (EX250: produced by Hoya-Schott Corporation) while the entire mold was kept at 70° C. After that, as shown in FIG. 2C, a cured optical element 2' was removed from the mold 1 to produce a diffractive optical element 4. The optical raw material 2 was cured by the UV exposure, thereby promoting polymerization thereof. Thus, an optical material made of the polyvinylcarbazole and the TiO2 particles is formed. Note that with respect to optical characteristics of the optical material composing the optical element 2', $n_d = 1.824$ and $v_d = 15.1$. The optical characteristics satisfy both $n_d > -6.667 \times 10^{-3} v_d + 1.70$ and $v_d \leq 16$.

On the other hand, as an optical material to be used for producing another optical element, a light curable resin 6 having optical characteristics of $n_d = 1.513$ and $v_d = 51.0$ was prepared. As shown in FIG. 3A, the light curable resin 6 was poured into a mold 5 formed in a diffraction grating shape. A glass (BK7) plate 7 was put on the light curable resin 6 to apply pressure as shown in FIG. 3B. After that, UV irradiation was conducted at 3000 mJ/cm² (100 mW/cm² and 30 seconds) by a UV exposure machine (EX250: produced by Hoya-Schott Corporation) which is not shown. Then, as shown in FIG. 3C, the cured light curable resin 6 was removed from the mold 5 to produce a diffractive optical element 8.

Next, an antireflection film was formed on the diffraction surface of the diffractive optical element 4 and on the diffraction surface of the diffractive optical element 8. Then, as shown in FIG. 4, the diffractive optical elements were combined with each other such that the diffraction gratings thereof were opposed to each other, thereby manufacturing a laminate type diffractive optical element 10. A spacer 9 determined an interval between the diffractive optical element 4 and the diffractive optical element 8. A pitch between respective adjacent gratings in the diffractive optical element 4 and the diffractive optical element 8 was 80.00 μm. An interval between troughs of the opposed diffraction gratings in the diffractive optical element 4 and the diffractive optical element 8 was 9.89 μm and an interval between crests thereof was 1.50 μm. A height of crests in the diffractive optical element 4 is 2.78 μm and a height of crests in the diffractive optical element 8 was 5.61 μm.

Figure 5:
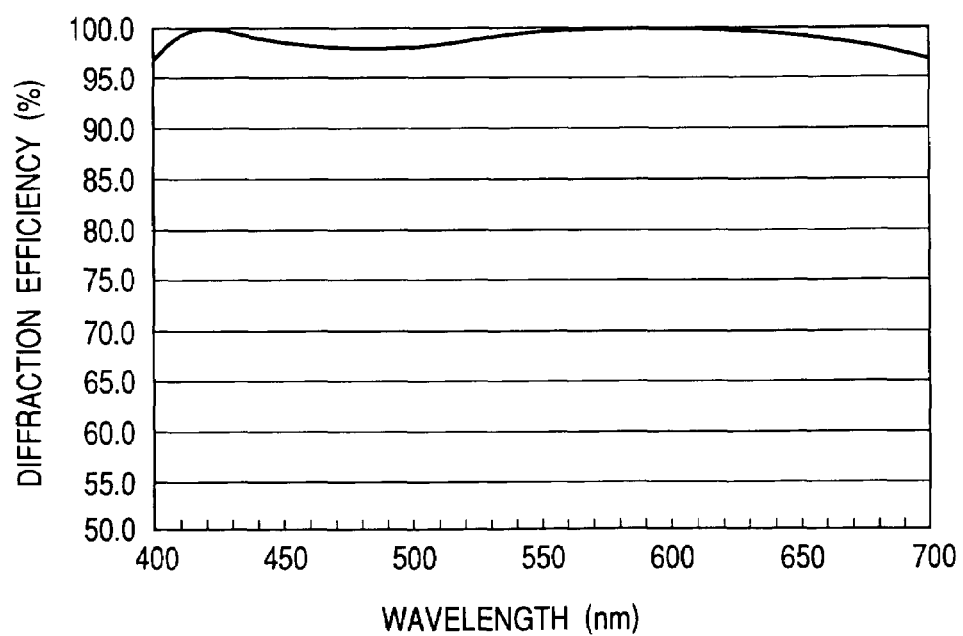
FIG. 5 is a graph showing a primary diffraction light intensity of the multilayer diffractive optical element according to Example 1.

FIG. 5 is a graph showing intensities in respective wavelengths (400 nm to 700 nm) of primary diffraction light at an incident angle of 0° with respect to the manufactured laminate type diffractive optical element 10. The abscissa indicates a wavelength and the ordinate indicates diffraction efficiency. In FIG. 5, the diffraction efficiency of the laminate type diffractive optical element 10 became 95% or more in a wavelength range of 400 nm to 700 nm which was the entire region of the use wavelength, showing a very preferable intensity-wavelength distribution.

Figure 6:
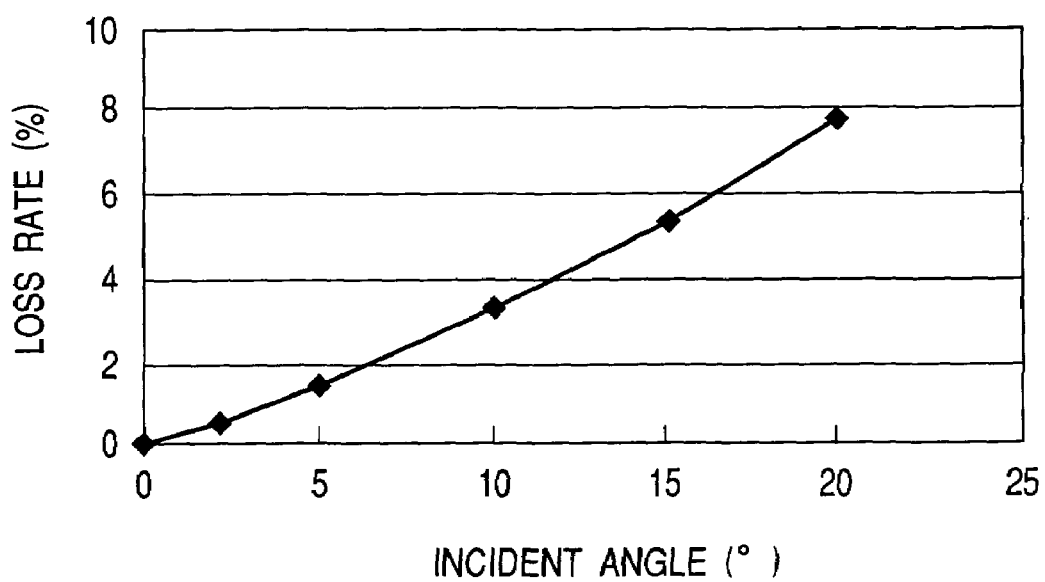
FIG. 6 is a graph showing a light loss rate of the multilayer diffractive optical element according to Example 1.

Also, FIG. 6 is a graph showing a reduction rate in an intensity of primary diffraction light at each incident angle in the case where an incident angle to the laminate type diffractive optical element 10 was changed. The abscissa indicates an incident angle and the ordinate indicates a light loss rate. In FIG. 6, the light loss rate becomes higher as the incident angle is increased. The light loss rate at the incident angle of 10° is 3.27%, which is not more than 3.40%. Accordingly, this value indicates a very preferable characteristic and it can be said that in the laminate type diffractive optical element 10, light beams are sufficiently concentrated on the specific order.

COMPARATIVE EXAMPLE 1

Next, referring to FIGS. 3A to 3C, FIGS. 7A to 7C, FIG. 8, FIG. 9, and FIG. 10, a structure of a laminate type diffractive optical element and a manufacturing method thereof according to Comparative Example 1 will be described. In Comparative Example 1,1-hydroxy-cyclohexyl-phenyl-ketone as a photoinitiator was added at a concentration of 1% to N-vinylcarbazole (produced by Tokyo Kasei Kogyo Co., Ltd.) to produce an optical raw material 202.

Next, as shown in FIG. 7A, the optical raw material 202 was supplied to a mold 201. Then, as shown in FIG. 7B, the optical raw material 202 was held by a glass (BK7) plate 203 and UV irradiation was conducted at 20000 mJ/cm² (100 mW/cm², 200 seconds) by a UV exposure machine (EX250: produced by Hoya-Schott Corporation) which is not shown, while the entire mold was kept at 70° C. After that, as shown in FIG. 7C, a light curable resin 202' was removed from the mold 201 to produce a diffractive optical element 204. The light curable resin 202' was cured by the UV exposure, thereby promoting polymerization thereof. Thus, the light curable resin became an optical material made of the polyvinylcarbazole. Note that with respect to optical characteristics of the optical material, $n_d = 1.702$ and $v_d = 17.4$. The optical characteristics satisfy $n_d > -6.667 \times 10^{-3} v_d + 1.70$ but do not satisfy $v_d \leq 16$.

On the other hand, as an optical material to be used for producing another optical element, a light curable resin 6 having optical characteristics of $n_d = 1.513$ and $v_d = 51.0$ was prepared, similarly to Example 1. As shown in FIGS. 3A to 3C, a diffractive optical element 8 was produced in the same manner as in Example 1.

Figure 8:
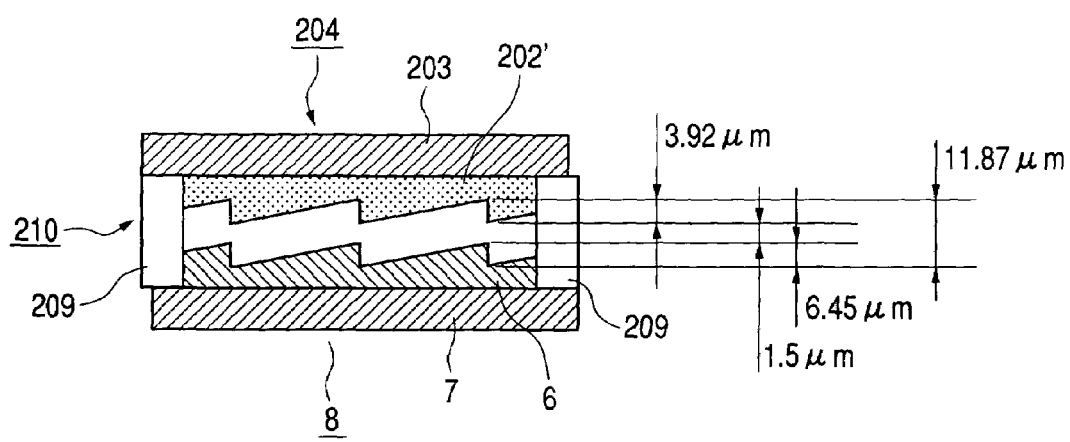
FIG. 8 is a sectional view showing a structure of a multilayer diffractive optical element according to Comparative Example 1.

Next, an antireflection film was formed on the diffractive optical element 204 and the diffractive optical element 8. Then, as shown in FIG. 8, the diffractive optical elements were combined with each other such that the diffraction gratings thereof were opposed to each other, thereby manufacturing a laminate type diffractive optical element 10. A spacer 209 determined an interval between the diffractive optical element 204 and the diffractive optical element 8. A pitch between respective adjacent gratings in the diffractive optical element 204 and the diffractive optical element 8 was 80.00 µm. An interval between troughs of the opposed diffraction gratings in the diffractive optical element 204 and the diffractive optical element 8 was 11.87 µm and an interval between crests thereof was 1.50 µm. A height of crests in the diffractive optical element 204 was 3.92 µm and a height of crests in the diffractive optical element 8 was 6.45 µm.

Figure 9:
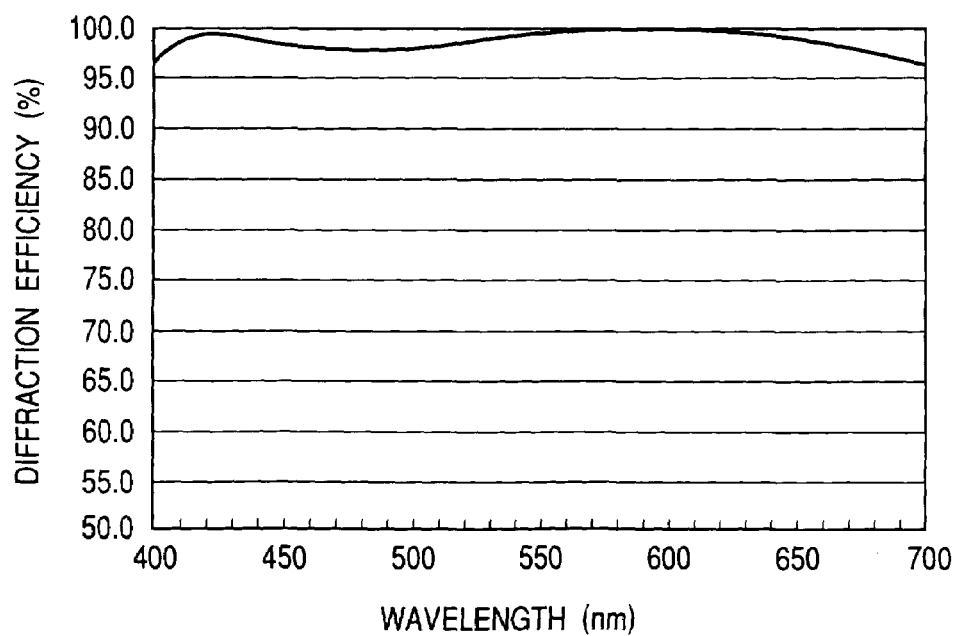
FIG. 9 is a graph showing a primary diffraction light intensity of the multilayer diffractive optical element according to Comparative Example 1.

FIG. 9 is a graph showing intensities in respective wavelengths (400 nm to 700 nm) of primary diffraction light at an incident angle of 0° with respect to the manufactured laminate type diffractive optical element 210. The abscissa indicates a wavelength and the ordinate indicates diffraction efficiency. In FIG. 9, the diffraction efficiency of the laminate type diffractive optical element 210 became 95% or more in a wavelength range of 400 nm to 700 nm which was the entire region of the use wavelength, showing a very preferable intensity-wavelength distribution.

Figure 10:
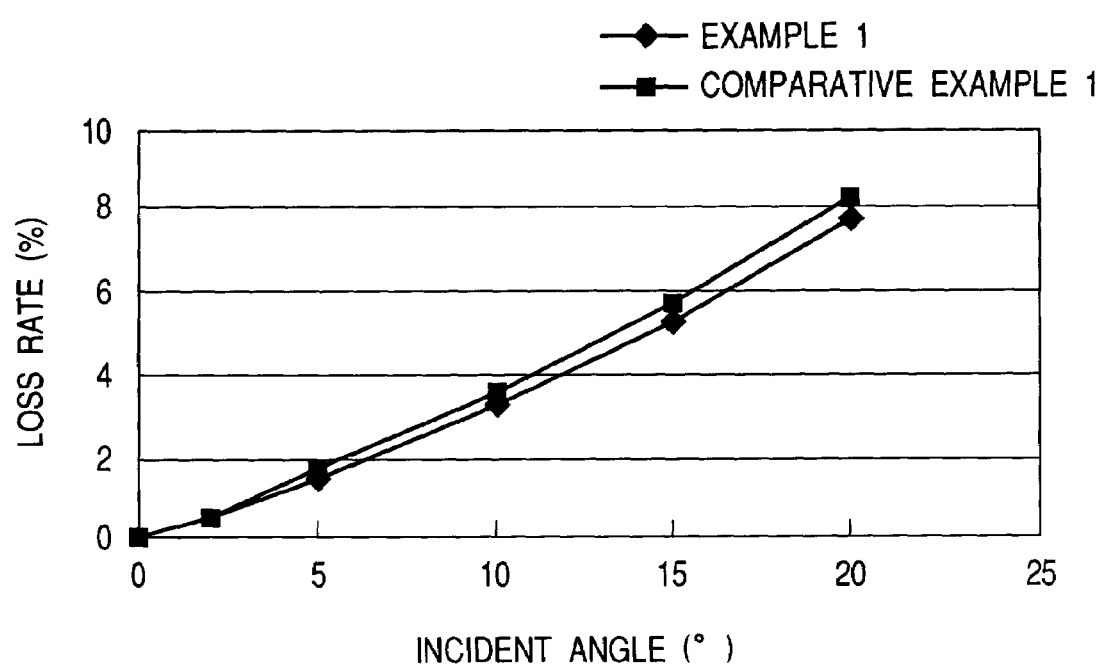
FIG. 10 is a graph showing a light loss rate of the multilayer diffractive optical element according to Comparative Example 1.

FIG. 10 is a graph showing a reduction rate in an intensity of primary diffraction light at each incident angle in the case where an incident angle to the laminate type diffractive optical element 210 was changed. The abscissa indicates an incident angle and the ordinate indicates a light loss rate. Note that values shown in FIG. 6 in Example 1 are also shown for comparison. In FIG. 10, the light loss rate becomes higher as the incident angle is increased. The light loss rate at the incident angle of 10° is 3.52%. This value is more than 3.40% which is a required light loss rate value. Accordingly, it cannot be said that the laminate type diffractive optical element 210 is the laminate type diffractive optical element in which light beams are sufficiently concentrated on the specific order.

EXAMPLE 2

Next, referring to FIGS. 3A to 3C, FIGS. 11A to 11C, FIG. 12, FIG. 13, and FIG. 14, a structure of a laminate type diffractive optical element and a manufacturing method thereof according to Example 2 will be described. First, 12 g of N-vinylcarbazole (produced by Tokyo Kasei Kogyo Co., Ltd.) and 0.15 g of 1-hydroxy-cyclohexyl-phenyl-ketone as a photoinitiator were added to 100 g of chloroform solution in which $Nb_2O_3$ fine particles having an average particle size of 10 nm were dispersed at 10 w %, and then chloroform was removed by reducing a pressure to produce an optical raw material 12.

Figure 11:
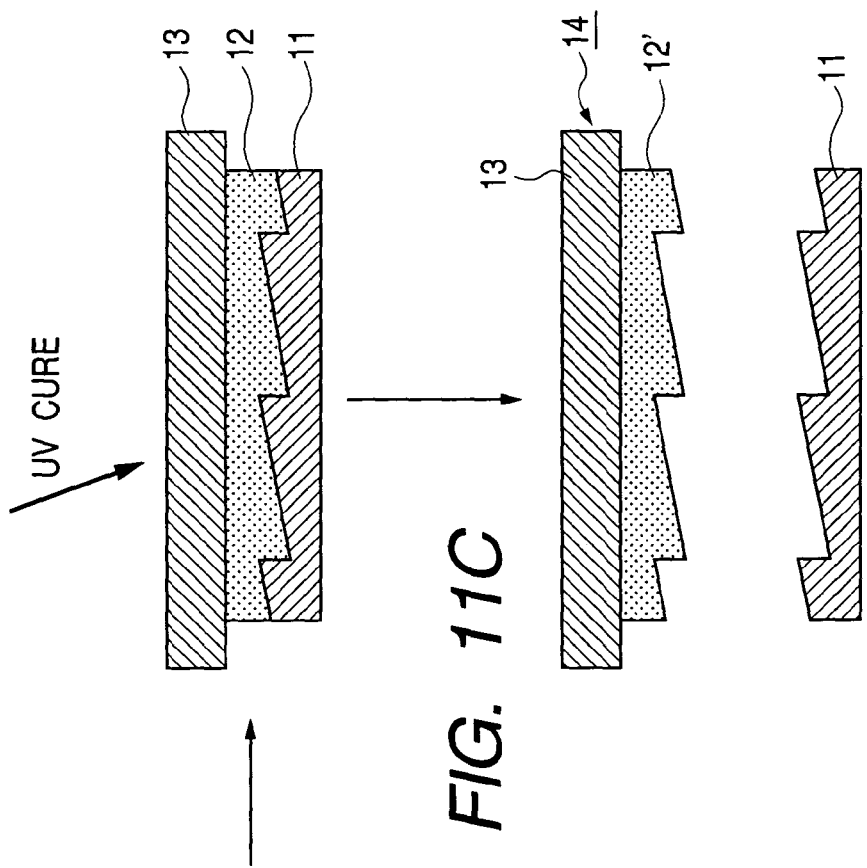
FIGS. 11A, 11B and 11C are sectional views showing a process of forming an optical element according to Example 2.

Next, as shown in FIG. 11A, the optical raw material 12 was supplied to a mold 11 formed in a diffraction grating shape. Then, as shown in FIG. 11B, a glass (BK7) plate 13 was put on the optical raw material 12 and UV irradiation was conducted at 20000 $mJ/cm^2$ (100 $mW/cm^2$, 200 seconds) by a UV exposure machine (EX250: produced by Hoya-Schott Corporation) while the entire mold was kept at 70° C. After that, as shown in FIG. 11C, a cured optical element 12' was removed from the mold 11 to produce a diffractive optical element 14. The optical raw material 12 as cured by the UV exposure, thereby promoting polymerization thereof. Thus, an optical material made of the polyvinylcarbazole and the $Nb_2O_3$ fine particles was formed. Note that with respect to optical characteristics of the optical material composing the optical element 12', $n_d=1.850$ and $v_d=16.0$. The optical characteristics satisfy both $n_d>-6.667\times 10^{-3}v_d+1.70$ and $v_d \leq 16$.

On the other hand, as an optical material to be used for producing another optical element, a light curable resin 6 having optical characteristics of $n_d=1.513$ and $v_d=51.0$ was prepared, similarly to Example 1. As shown in FIGS. 3A to 3C, a diffractive optical element 8 was produced in the same manner as in Example 1.

Figure 12:
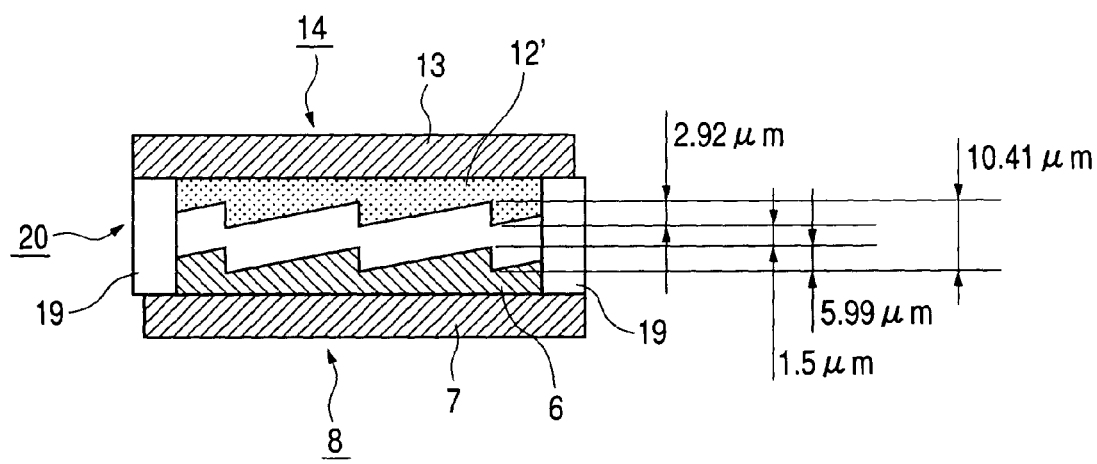
FIG. 12 is a sectional view showing a structure of a multilayer diffractive optical element according to Example 2.

Next, an antireflection film was formed on the diffraction surface of the diffractive optical element 14 and the diffraction surface of the diffractive optical element 8. Then, as shown in FIG. 12, the diffractive optical elements were combined with each other such that the diffraction gratings thereof were opposed to each other, thereby manufacturing a laminate type diffractive optical element 20. A spacer 19 determined an interval between the diffractive optical element 14 and the diffractive optical element 8. A pitch between respective adjacent gratings in the diffractive optical element 14 and the diffractive optical element 8 was 80.00 µm. An interval between troughs of the opposed diffraction gratings in the diffractive optical element 14 and the diffractive optical element 8 was 10.41 µm and an interval between crests thereof was 1.50 µm. A height of crests in the diffractive optical element 14 is 2.92 µm and a height of crests in the diffractive optical element 8 was 5.99 µm.

Figure 13:
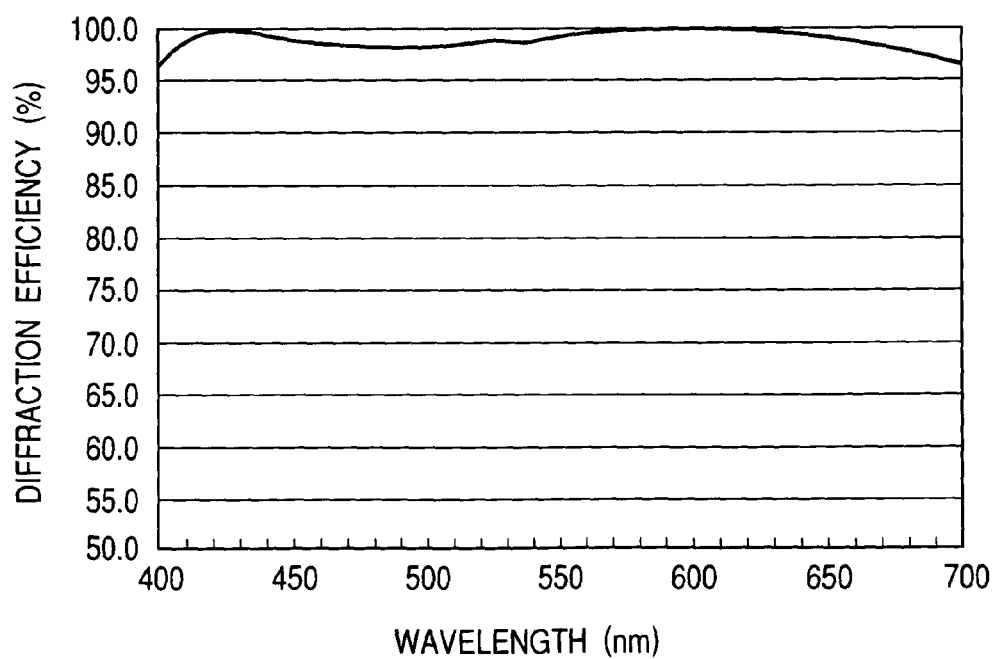
FIG. 13 is a graph showing a primary diffraction light intensity of the multilayer diffractive optical element according to Example 2.

FIG. 13 is a graph showing intensities in respective wavelengths (400 nm to 700 nm) of primary diffraction light at an incident angle of 0° with respect to the manufactured laminate type diffractive optical element 20. The abscissa indicates a wavelength and the ordinate indicates diffraction efficiency. In FIG. 13, the diffraction efficiency of the laminate type diffractive optical element 20 became 95% or more in a wavelength range of 400 nm to 700 nm which is the entire region of the use wavelength, showing a very preferable intensity-wavelength distribution.

Figure 14:
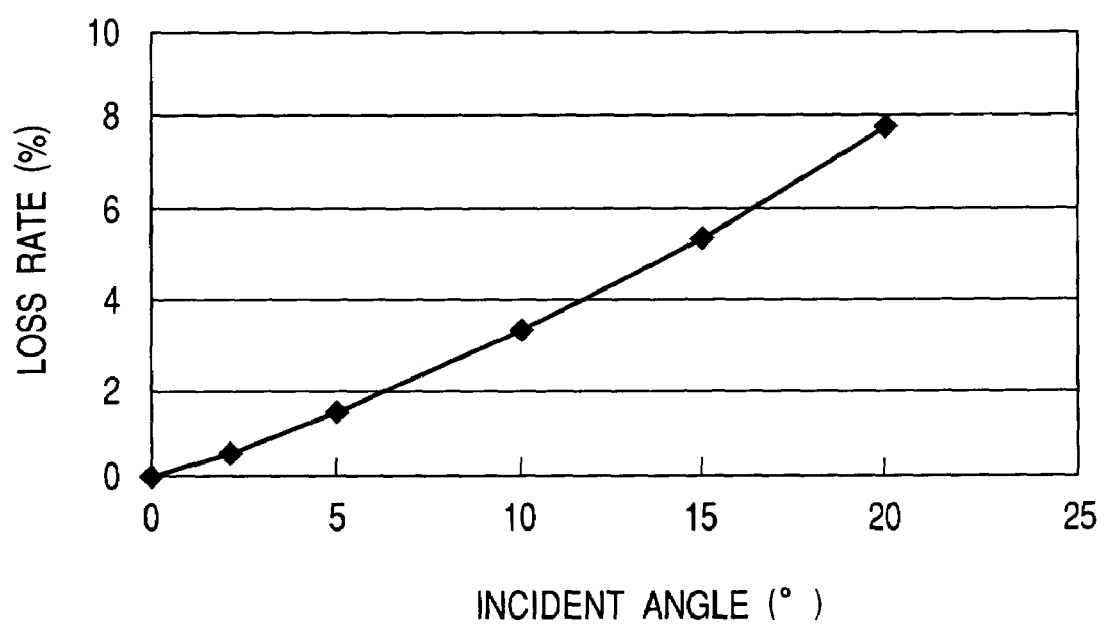
FIG. 14 is a graph showing a light loss rate of the multilayer diffractive optical element according to Example 2.

Also, FIG. 14 is a graph showing a reduction rate in an intensity of primary diffraction light at each incident angle in the case where an incident angle to the laminate type diffractive optical element 20 was changed. The abscissa indicates an incident angle and the ordinate indicates a light loss rate. In FIG. 14, the light loss rate becomes higher as the incident angle is increased. The light loss rate at the incident angle of 10° is 3.40%. Accordingly, this value indicates a very preferable characteristic and it can be said that in the laminate type diffractive optical element 20, light beams are sufficiently concentrated on the specific order.

EXAMPLE 3

Next, referring to FIGS. 3A to 3C, FIGS. 15A to 15C, FIG. 16, FIG. 17, and FIG. 18, a structure of a laminate type diffractive optical element and a manufacturing method thereof according to Example 3 will be described. First, 130 g of N-vinylcarbazole (produced by Tokyo Kasei Kogyo Co., Ltd.) and 0.15 g of 1-hydroxy-cyclohexyl-phenyl-ketone as a photoinitiator were added to 130 g of chloroform solution in which $Cr_2O_5$ fine particles having an average particle size of 10 nm were dispersed at 10 w %, and then chloroform was removed by reducing a pressure to produce an optical raw material 22.

Next, as shown in FIG. 15A, the optical raw material 12 as supplied to a mold 21 formed in a diffraction grating shape. Then, as shown in FIG. 15B, a glass (BK7) plate 23 was put on the optical material 22 and UV irradiation was conducted at 20000 $mJ/cm^2$ (100 $mW/cm^2$, 200 seconds) by a UV exposure machine (EX250: produced by Hoya-Schott Corporation) while the entire mold was kept at 70° C. After that, as shown in FIG. 15C, a cured optical element 22' was removed from the mold 21 to produce a diffractive optical element 24. The optical raw material 22 was cured by the UV exposure, thereby promoting polymerization thereof. Thus, an optical material made of the polyvinylcarbazole and the $Cr_2O_5$ fine particles was formed. Note that with respect to optical characteristics of the optical material composing the optical element 22', $n_d$=1.824 and $v_d$=15.9. The optical characteristics satisfy both $n_d$>−6.667×$10^{-3}v_d$+1.70 and $v_d$≦16.

On the other hand, as an optical material to be used for producing another optical element, a light curable resin 6 having optical characteristics of $n_d$=1.513 and $v_d$=51.0 was prepared, similarly to Example 1. As shown in FIGS. 3A to 3C, a diffractive optical element 8 was produced in the same manner as in Example 1.

Figure 16:
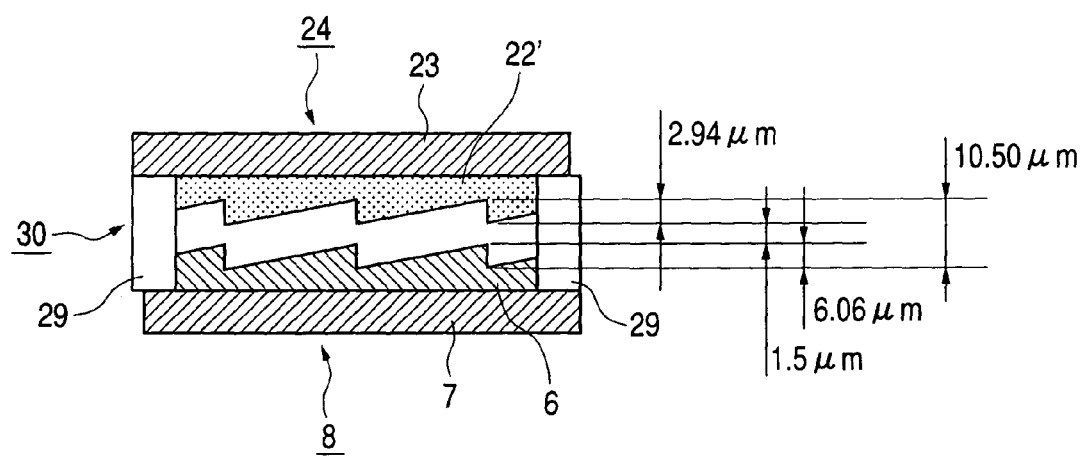
FIG. 16 is a sectional view showing a structure of a multilayer diffractive optical element according to Example 3.

Next, an antireflection film was formed on the diffraction surface of the diffractive optical element 24 and the diffraction surface of the diffractive optical element 8. Then, as shown in FIG. 16, the diffractive optical elements were combined with each other such that the diffraction gratings thereof were opposed to each other, thereby manufacturing a laminate type diffractive optical element 30. A spacer 29 determined an interval between the diffractive optical element 24 and the diffractive optical element 8. A pitch between respective adjacent gratings in the diffractive optical element 24 and the diffractive optical element 8 was 80.00 μm. An interval between troughs of the opposed diffraction gratings in the diffractive optical element 24 and the diffractive optical element 8 was 10.50 μm and an interval between crests thereof was 1.50 μm. A height of crests in the diffractive optical element 24 was 2.94 μm and a height of crests in the diffractive optical element 8 was 6.06 μm.

Figure 17:
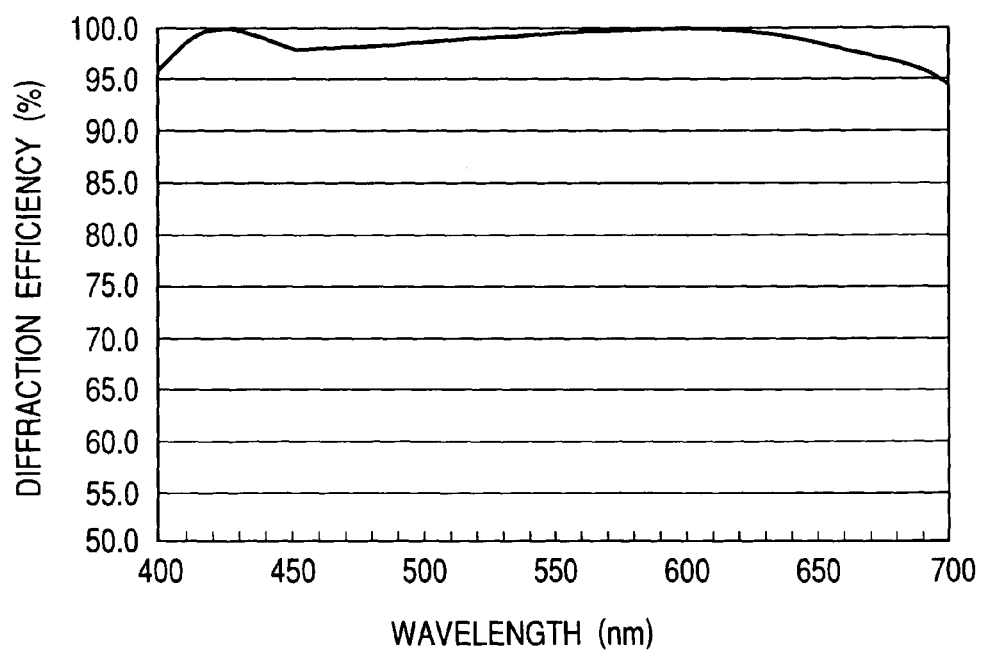
FIG. 17 is a graph showing a primary diffraction light intensity of the multilayer diffractive optical element according to Example 3.

FIG. 17 is a graph showing intensities in respective wavelengths (400 nm to 700 nm) of primary diffraction light at an incident angle of 0° with respect to the manufactured laminate type diffractive optical element 30. The abscissa indicates a wavelength and the ordinate indicates diffraction efficiency. In FIG. 17, the diffraction efficiency of the laminate type diffractive optical element 30 became 95% or more in a wavelength range of 400 nm to 700 nm which was the entire region of the use wavelength, showing a very preferable intensity-wavelength distribution.

Figure 18:
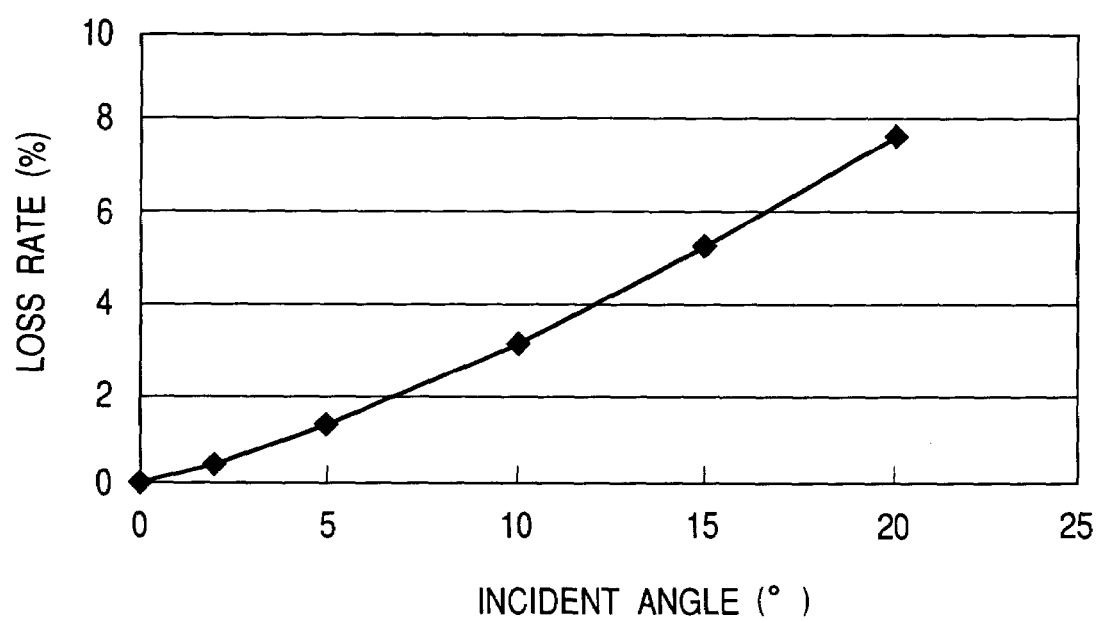
FIG. 18 is a graph showing a light loss rate of the multilayer diffractive optical element according to Example 3.

Also, FIG. 18 is a graph showing a reduction rate in an intensity of primary diffraction light at each incident angle in the case where an incident angle to the laminate type diffractive optical element 30 was changed. The abscissa indicates an incident angle and the ordinate indicates a light loss rate. In FIG. 18, the light loss rate becomes higher as the incident angle is increased. The light loss rate at the incident angle of 10° was 3.40%. Accordingly, this value indicates a very preferable characteristic and it can be said that in the laminate type diffractive optical element 30, light beams are sufficiently concentrated on the specific order.

EXAMPLE 4

Next, referring to FIGS. 3A to 3C, FIGS. 19A to 19C, FIG. 20, FIG. 21 and FIG. 22, a structure of a laminate type diffractive optical element and a manufacturing method thereof according to Example 4 will be described. First, 12 g of N-vinylcarbazole (produced by Tokyo Kasei Kogyo Co., Ltd.) and 0.15 g of 1-hydroxy-cyclohexyl-phenyl-ketone as a photoinitiator are added to 100 g of chloroform solution in which $BaTiO_3$ fine particles having an average particle size of 10 nm were dispersed at 10 w %, and then chloroform was removed by reducing a pressure to produce an optical raw material 32.

Next, as shown in FIG. 19A, the optical raw material 32 was supplied to a mold 31 formed in a diffraction grating shape. Then, as shown in FIG. 19B, a glass (BK7) plate 33 was put on the optical raw material 32 and UV irradiation was conducted at 20000 mJ/$cm^2$ (100 mW/$cm^2$, 200 seconds) by a UV exposure machine (EX250: produced by Hoya-Schott Corporation) while the entire mold was kept at 70° C. After that, as shown in FIG. 19C, a cured optical element 32' was removed from the mold 31 to produce a diffractive optical element 34. The optical raw material 32 was cured by the UV exposure, thereby promoting polymerization thereof. Thus, an optical material made of the polyvinylcarbazole and the $BaTiO_3$ fine particles was formed. Note that with respect to optical characteristics of the optical material composing the optical element 32', $n_d$=1.867 and $v_d$=14.7. The optical characteristics satisfy both $n_d$>−6.667×$10^{-3}v_d$+1.70 and $v_d$≦16.

On the other hand, as an optical material to be used for producing another optical element, a light curable resin 6 having optical characteristics of $n_d$=1.513 and $v_d$=51.0 was prepared, similarly to Example 1. As shown in FIGS. 3A to 3C, a diffractive optical element 8 was produced in the same manner as in Example 1.

Figure 20:
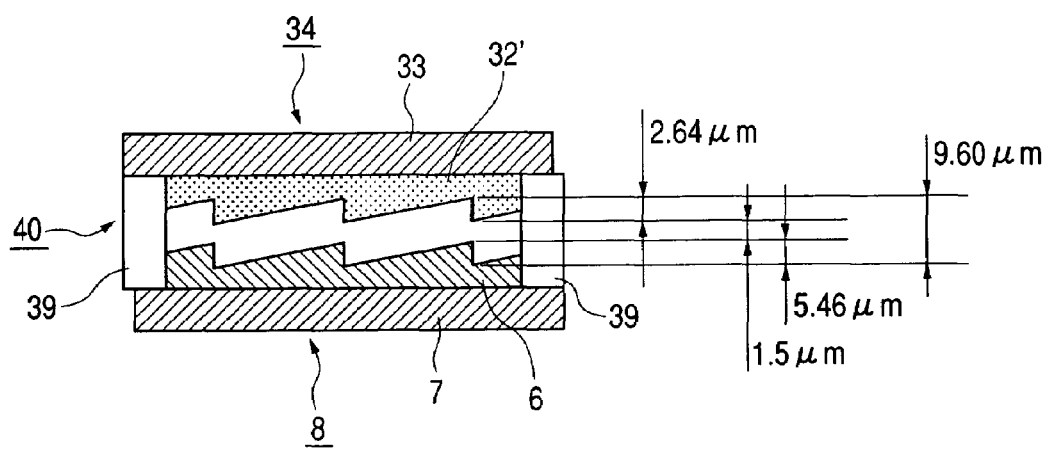
FIG. 20 is a sectional view showing a structure of a multilayer diffractive optical element according to Example 4.

Next, an antireflection film was formed on the diffraction surface of the diffractive optical element 34 and the diffraction surface of the diffractive optical element 8. Then, as shown in FIG. 20, the diffractive optical elements were combined with each other such that the diffraction gratings thereof were opposed to each other, thereby manufacturing a laminate type diffractive optical element 40. A spacer 39 determined an interval between the diffractive optical element 34 and the diffractive optical element 8. A pitch between respective adjacent gratings in the diffractive optical element 34 and the diffractive optical element 8 was 80.00 μm. An interval between troughs of the opposed diffraction gratings in the diffractive optical element 34 and the diffractive optical element 8 was 9.60 μm and an interval between crests thereof was 1.50 μm. A height of crests in the diffractive optical element 34 was 2.64 μm and a height of crests in the diffractive optical element 8 was 5.46 μm.

Figure 21:
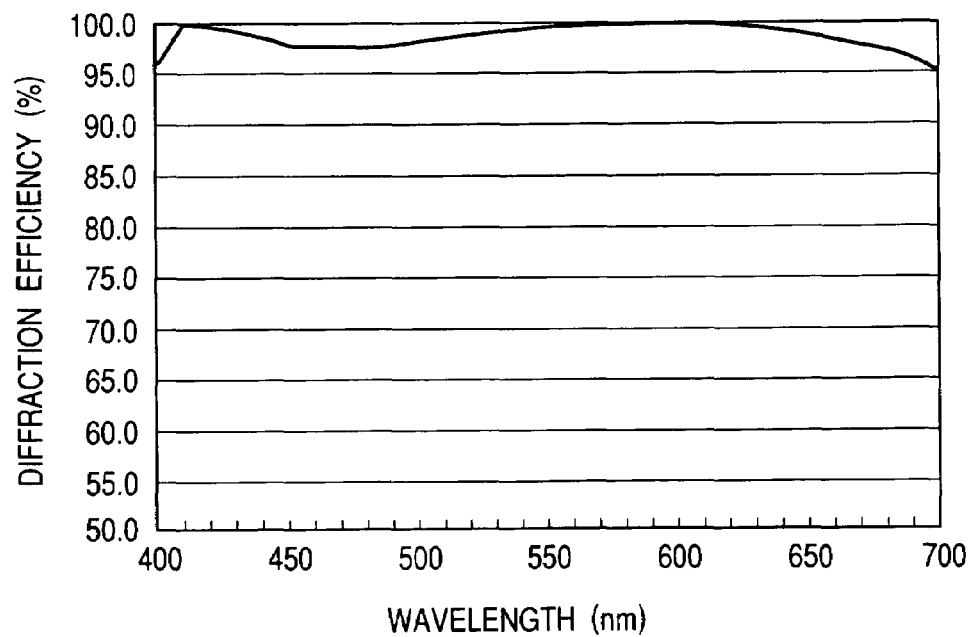
FIG. 21 is a graph showing a primary diffraction light intensity of the multilayer diffractive optical element according to Example 4.

FIG. 21 is a graph showing intensities in respective wavelengths (400 nm to 700 nm) of primary diffraction light at an incident angle of 0° with respect to the manufactured laminate type diffractive optical element 40. The abscissa indicates a wavelength and the ordinate indicates diffraction efficiency. In FIG. 21, the diffraction efficiency of the laminate type diffractive optical element 40 became 95% or more in a wavelength range of 400 nm to 700 nm which was the entire region of the use wavelength, showing a very preferable intensity-wavelength distribution.

Figure 22:
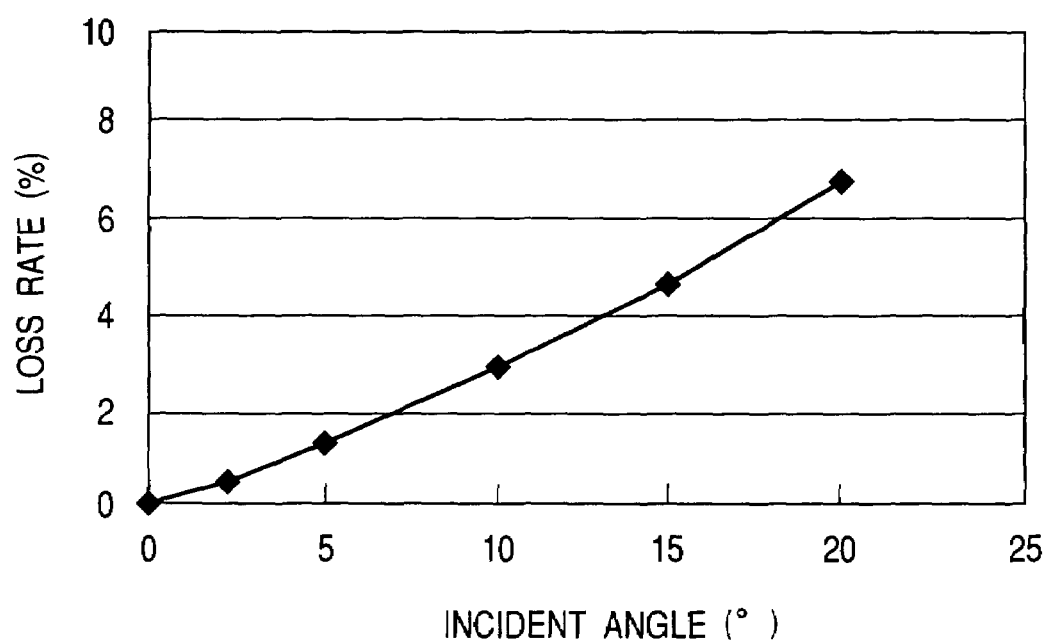
FIG. 22 is a graph showing a light loss rate of the multilayer diffractive optical element according to Example 4.

Also, FIG. 22 is a graph showing a reduction rate in an intensity of primary diffraction light at each incident angle in the case where an incident angle to the laminate type diffractive optical element 40 was changed. The abscissa indicates an incident angle and the ordinate indicates a light loss rate. In FIG. 14, the light loss rate becomes higher as the incident angle is increased. The light loss rate at the incident angle of 10° is 3.24%, which is not more than 3.40%. Accordingly, this value indicates a very preferable characteristic and it can be said that in the laminate type diffractive optical element 10, light beams are sufficiently concentrated on the specific order.

EXAMPLE 5

Figure 23A:
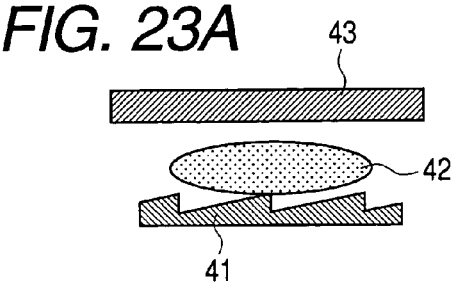
FIGS. 23A, 23B, 23C, 23D, 23E, 23F, 23G, 23H, and 23I are sectional views showing a process of forming an optical element according to Example 5.
Figure 23B:
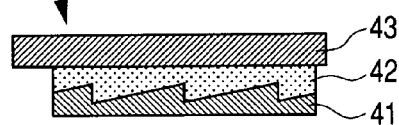
Figure 23C:
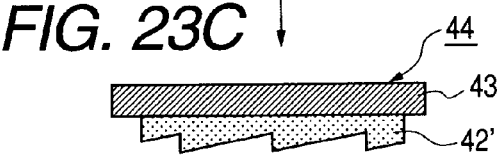
Figure 23D:
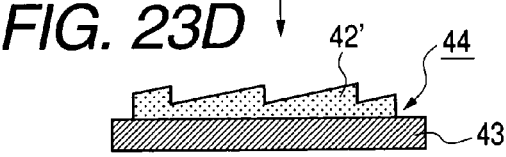
Figure 23E:
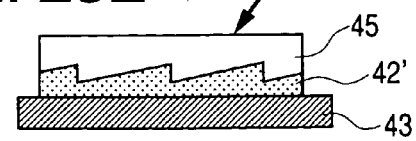
Figure 23F:
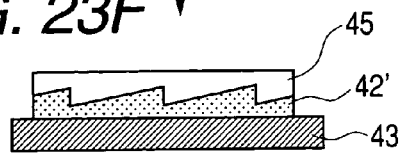
Figure 23G:
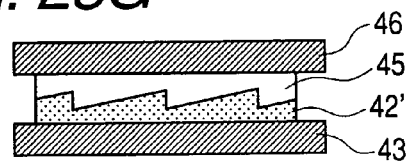
Figure 23H:
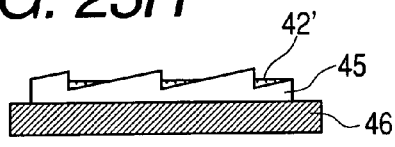
Figure 23I:
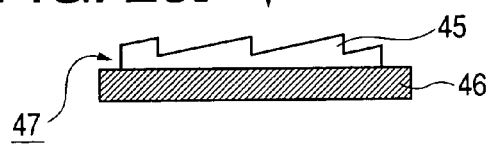

Next, referring to FIGS. 3A to 3C, FIGS. 23A to 23I, FIG. 24, FIG. 25, and FIG. 26, a structure of a laminate type diffractive optical element and a manufacturing method thereof according to Example 5 will be described. First, methyl methacrylate to which 1-hydroxy-cyclohexyl-phenyl-ketone as a photoinitiator was added at a concentration of 1% was used to produce an optical raw material 42. Then, as shown in FIG. 23A, the optical raw material 42 was supplied to a mold 41 formed in a diffraction grating shape. Then, as shown in FIG. 23B, a glass (BK7) plate 43 was put on the optical raw material 42 and UV irradiation was conducted at 3000 mJ/cm$^2$ (100 mW/cm$^2$ and 30 seconds) by a UV exposure machine (EX250: produced by Hoya-Schott Corporation). After that, as shown in FIG. 23C, a cured optical element 42' was removed from the mold 41. Thus, as shown in FIG. 23D, a diffractive optical element 44 was produced. Then, as shown in FIG. 23E, a TiO2 film 45 having a thickness of 4 μm was formed as an optical material on the optical element 42' at the degree of vacuum of 2×10$^{-4}$ Pa. Then, as shown in FIG. 23F, the surface of the TiO$_2$ film 45 was polished to make a plane in which the number of Newton lines was 1 or less. After that, as shown in FIG. 23G, a glass plate 46 to which a silane coupling agent was applied was bonded onto the TiO$_2$ film 45. Then, as shown in FIG. 23H, cured PMMA was dissolved by immersing the glass plate 46 in a methyl isobutyl ketone solvent. Accordingly, as shown in FIG. 23I, a diffractive optical element 47 made of TiO$_2$ was produced. At this time, with respect to optical characteristics of the TiO2 as an optical material, $n_d$=2.226 and $v_d$=12.6.

On the other hand, as an optical material to be used for producing another optical element, a light curable resin 6 having optical characteristics of $n_d$=1.513 and $v_d$=51.0 was prepared, similarly to Example 1. As shown in FIGS. 3A to 3C, a diffractive optical element 8 was produced in the same manner as in Example 1.

Figure 24:
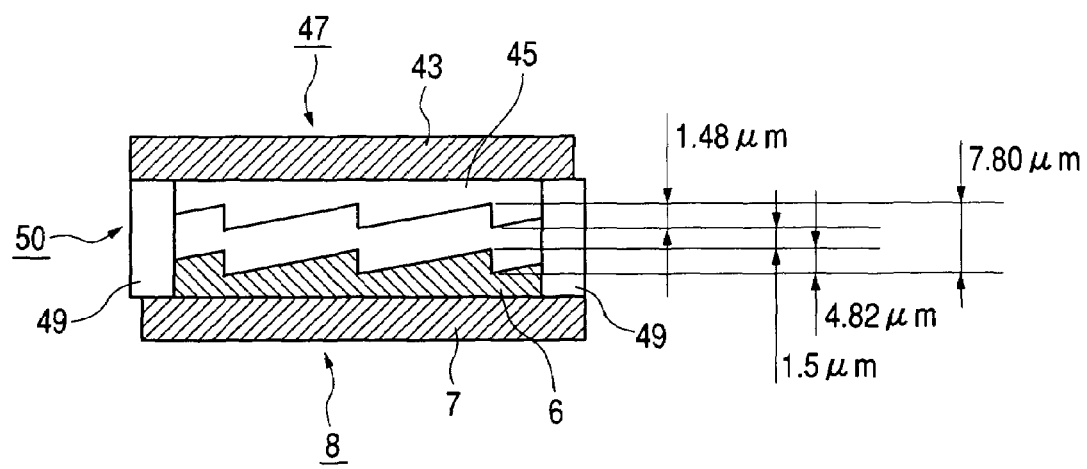
FIG. 24 is a sectional view showing a structure of a multilayer diffractive optical element according to Example 5.

Next, an antireflection film was formed on the diffraction surface of the diffractive optical element 47 and the diffraction surface of the diffractive optical element 8. Then, as shown in FIG. 24, the diffractive optical elements were combined with each other such that the diffraction gratings thereof were opposed to each other, thereby manufacturing a laminate type diffractive optical element 50. A spacer 49 determined an interval between the diffractive optical element 47 and the diffractive optical element 8. A pitch between respective adjacent gratings in the diffractive optical element 47 and the diffractive optical element 8 was 80.00 μm. An interval between troughs of the opposed diffraction gratings in the diffractive optical element 47 and the diffractive optical element 8 was 7.80 μm and an interval between crests thereof was 1.5 μm. A height of crests in the diffractive optical element 47 was 1.48 μm and a height of crests in the diffractive optical element 8 was 4.82 μm.

Figure 25:
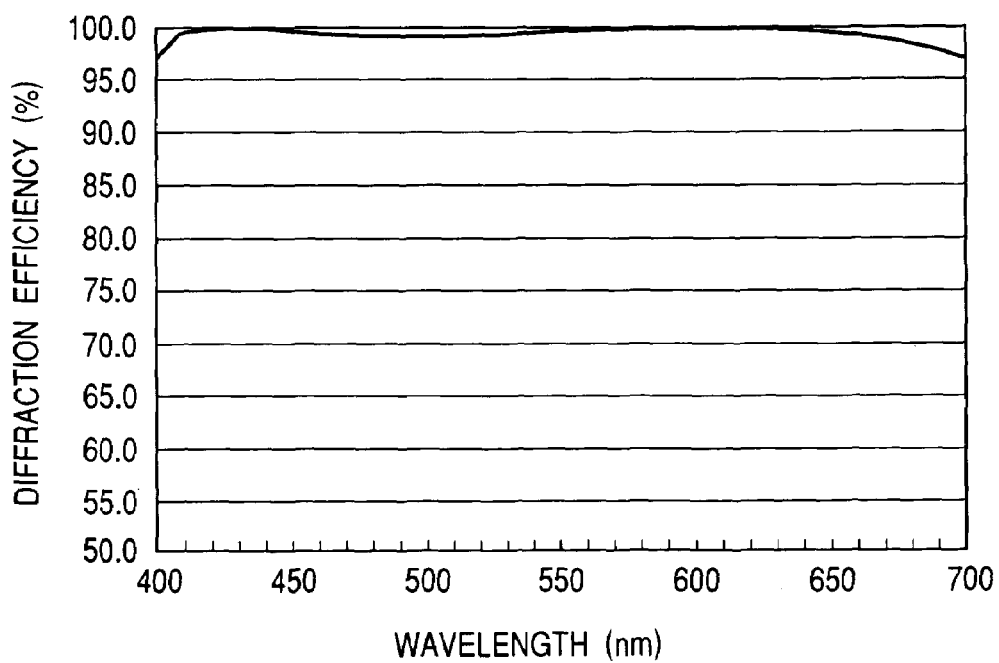
FIG. 25 is a graph showing a primary diffraction light intensity of the multilayer diffractive optical element according to Example 5.

FIG. 25 is a graph showing intensities in respective wavelengths (400 nm to 700 nm) of primary diffraction light at an incident angle of 0° with respect to the manufactured laminate type diffractive optical element 50. The abscissa indicates a wavelength and the ordinate indicates diffraction efficiency. In FIG. 25, the diffraction efficiency of the laminate type diffractive optical element 50 became 95% or more in a wavelength range of 400 nm to 700 nm which was the entire region of the use wavelength, showing a very preferable intensity-wavelength distribution.

Figure 26:
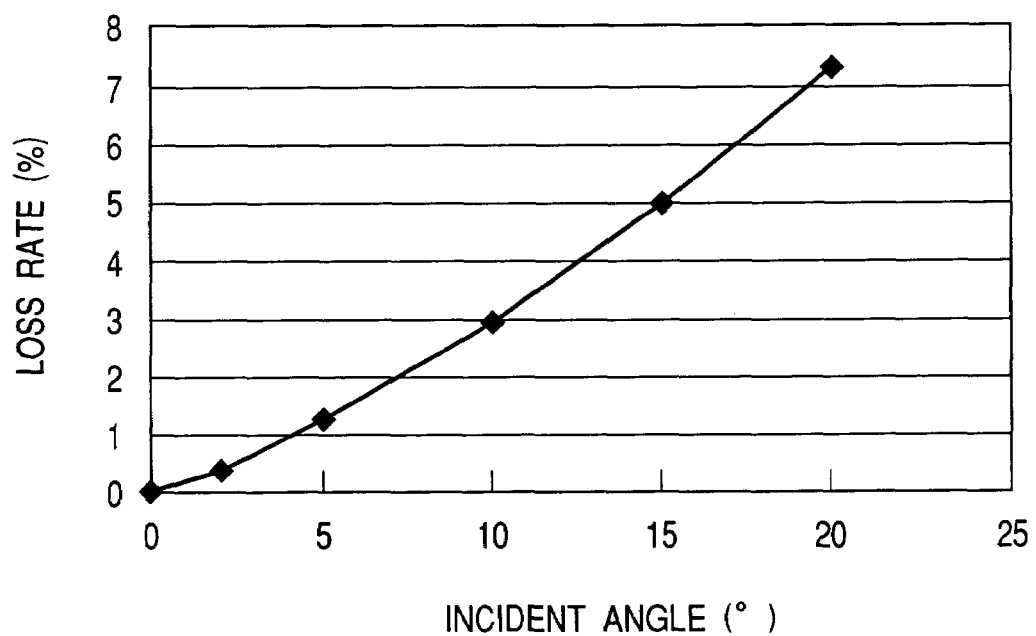
FIG. 26 is a graph showing a light loss rate of the multilayer diffractive optical element according to Example 5.

Also, FIG. 26 is a graph showing a reduction rate in an intensity of primary diffraction light at each incident angle in the case where an incident angle to the laminate type diffractive optical element 50 was changed. The abscissa indicates an incident angle and the ordinate indicates a light loss rate. In FIG. 26, the light loss rate becomes higher as the incident angle is increased. The light loss rate at the incident angle of 10° was 3.06%, which was not more than 3.40%. Accordingly, this value indicates a very preferable characteristic and it can be said that in the laminate type diffractive optical element 40, light beams are sufficiently concentrated on the specific order.

EXAMPLE 6

Figure 27A:
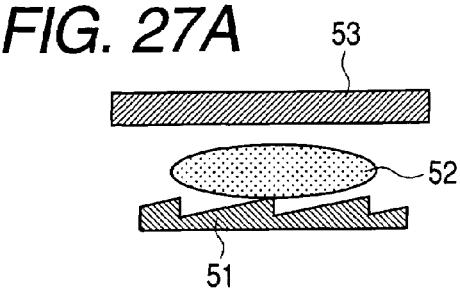
FIGS. 27A, 27B, 27C, 27D, 27E, 27F, 27G, 27H, and 27I are sectional views showing a process of forming an optical element according to Example 6.
Figure 27B:
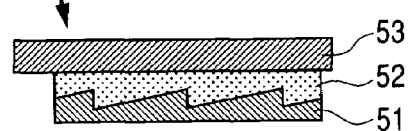
Figure 27C:
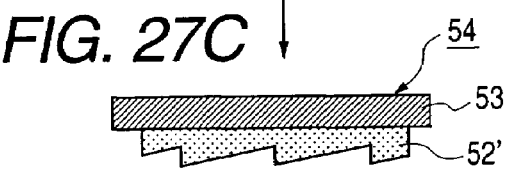
Figure 27D:
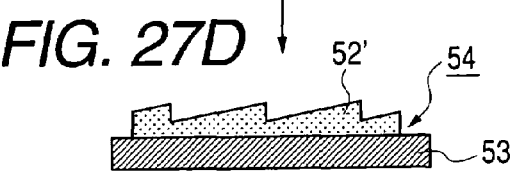
Figure 27E:
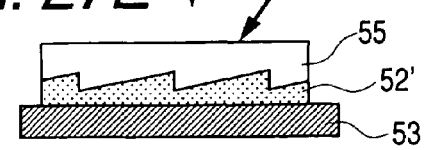
Figure 27F:
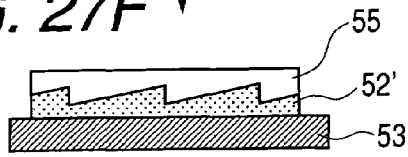
Figure 27G:
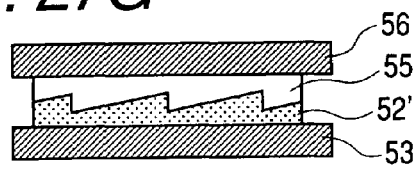
Figure 27H:
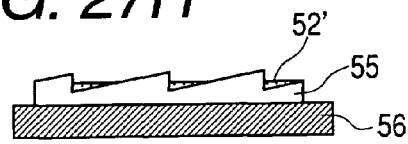
Figure 27I:
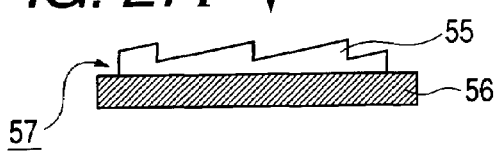

Next, referring to FIGS. 3A to 3C, FIGS. 27A to 27I, FIG. 28, FIG. 29, and FIG. 30, a structure of a laminate type diffractive optical element and a manufacturing method thereof according to Example 6 will be described. First, methyl methacrylate to which 1-hydroxy-cyclohexyl-phenyl-ketone as a photoinitiator was added at a concentration of 1% was used to produce an optical raw material 52. Then, as shown in FIG. 27A, the optical raw material 52 was supplied to a mold 51 formed in a diffraction grating shape. Then, as shown in FIG. 27B, a glass (BK7) plate 53 was put on the optical raw material 52 and UV irradiation was conducted at 3000 mJ/cm$^2$ (100 mW/cm$^2$, 30 seconds) by a UV exposure machine (EX250: produced by Hoya-Schott Corporation). After that, as shown in FIG. 27C, a cured optical element 52' was removed from the mold 51. Thus, as shown in FIG. 27D, a diffractive optical element 54 was produced. Then, as shown in FIG. 27E, a TiO$_2$ film 55 having a thickness of 4 μm was formed as an optical material on the optical element 52' at the degree of vacuum of 2×10$^{-4}$ Pa. Then, as shown in FIG. 27F, the surface of the Nb$_2$O$_3$ film 55 was polished to make a plane in which the number of Newton lines was 1 or less. After that, as shown in FIG. 27G, a glass plate 56 to which a silane coupling agent was applied was bonded onto the Nb$_2$O$_3$ film 55. Then, as shown in FIG. 27H, cured PMMA was dissolved by immersing the glass plate 56 in a methyl isobutyl ketone solvent. Accordingly, as shown in FIG. 27I, a diffractive optical element 57 made of Nb$_2$O$_3$ was produced. At this time, with respect to optical characteristics of the Nb$_2$O$_3$ as an optical material, $n_d$=2.367 and $v_d$=14.6.

On the other hand, as an optical material to be used for producing another optical element, a light curable resin 6 having optical characteristics of $n_d$=1.513 and $v_d$=51.0 was prepared, similarly to Example 1. As shown in FIGS. 3A to 3C, a diffractive optical element 8 was produced in the same manner as in Example 1.

Figure 28:
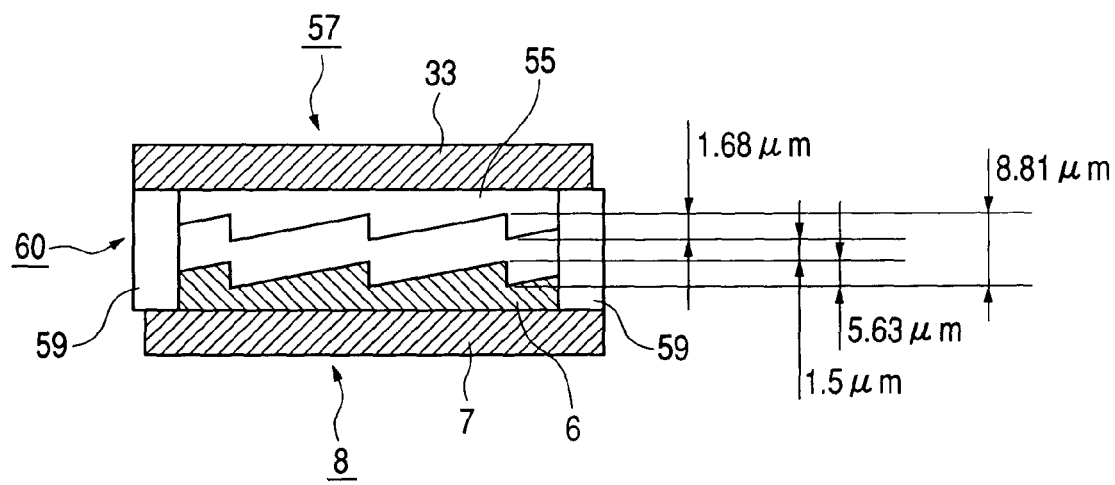
FIG. 28 is a sectional view showing a structure of a multilayer diffractive optical element according to Example 6.

Next, an antireflection film was formed on the diffraction surface of the diffractive optical element 57 and the diffraction surface of the diffractive optical element 8. Then, as shown in FIG. 28, the diffractive optical elements were combined with each other such that the diffraction gratings thereof were opposed to each other, thereby manufacturing a laminate type diffractive optical element 60. A spacer 59 determined an interval between the diffractive optical element 57 and the diffractive optical element 8. A pitch between respective adjacent gratings in the diffractive optical element 57 and the diffractive optical element 8 was 80.00 μm. An interval between troughs of the opposed diffraction gratings in the diffractive optical element 57 and the diffractive optical element 8 was 8.81 μm and an interval between crests thereof was 1.5 μm. A height of crests in the diffractive optical element 57 was 1.68 μm and a height of crests in the diffractive optical element 8 was 5.63 μm.

Figure 29:
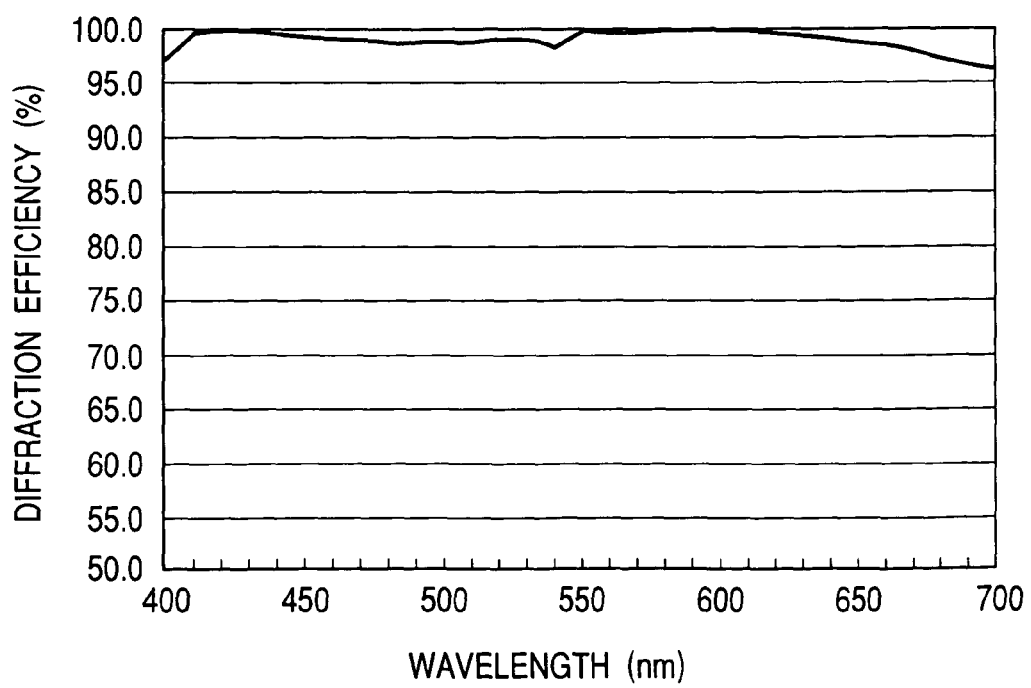
FIG. 29 is a graph showing a primary diffraction light intensity of the multilayer diffractive optical element according to Example 6.

FIG. 29 is a graph showing intensities in respective wavelengths (400 nm to 700 nm) of primary diffraction light at an incident angle of 0° with respect to the manufactured laminate type diffractive optical element 60. The abscissa indicates a wavelength and the ordinate indicates diffraction efficiency. In FIG. 29, the diffraction efficiency of the laminate type diffractive optical element 60 became 95% or more in a wavelength range of 400 nm to 700 nm which was the entire region of the use wavelength, showing a very preferable intensity-wavelength distribution.

Figure 30:
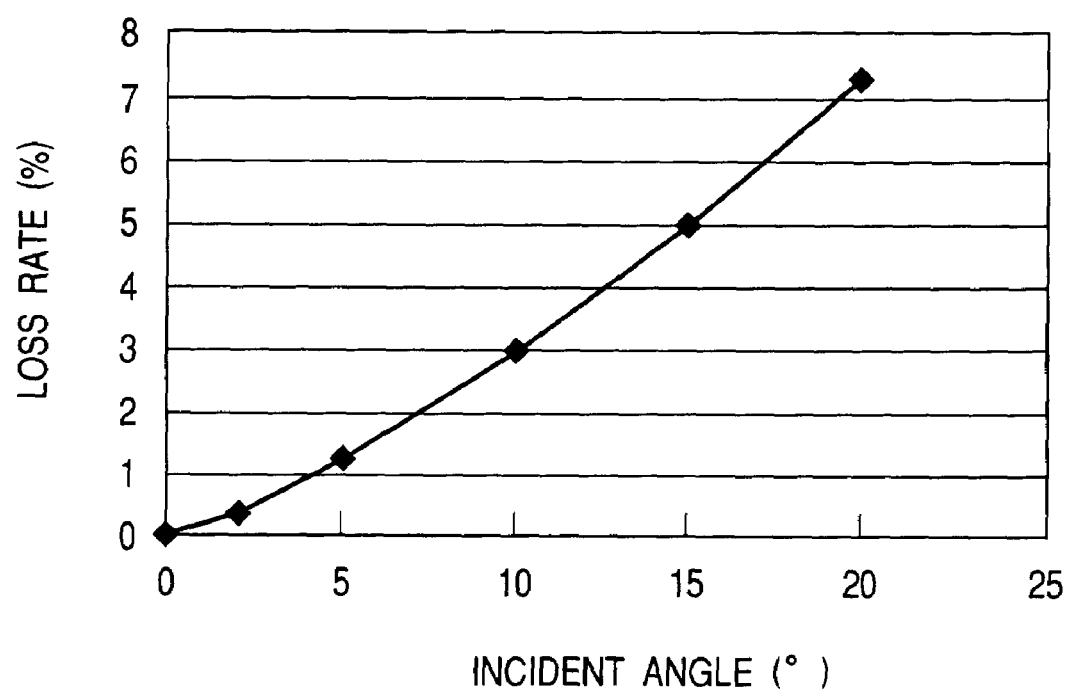
FIG. 30 is a graph showing a light loss rate of the multilayer diffractive optical element according to Example 6.

Also, FIG. 30 is a graph showing a reduction rate in an intensity of primary diffraction light at each incident angle in the case where an incident angle to the laminate type diffractive optical element 60 was changed. The abscissa indicates an incident angle and the ordinate indicates a light loss rate. In FIG. 30, the light loss rate becomes higher as the incident angle is increased. The light loss rate at the incident angle of 10° was 3.15%, which was not more than 3.40%. Accordingly, this value indicates a very preferable characteristic and it can be said that in the laminate type diffractive optical element 60, light beams are sufficiently concentrated on the specific order.

EXAMPLE 7

Next, referring to FIGS. 3A to 3C, FIGS. 31A to 31I, FIG. 32, FIG. 33, and FIG. 34, a structure of a laminate type diffractive optical element and a manufacturing method thereof according to Example 7 will be described. First, methyl methacrylate to which 1-hydroxy-cyclohexyl-phenyl-ketone as a photoinitiator was added at a concentration of 1% was used to produce an optical raw material 62. Then, as shown in FIG. 31A, the optical raw material 62 was supplied to a mold 61 formed in a diffraction grating shape. Then, as shown in FIG. 31B, a glass (BK7) plate 63 was put on the optical raw material 62 and UV irradiation was conducted at 3000 mJ/cm$^2$ (100 mW/cm$^2$, 30 seconds) by a UV exposure machine (EX250: produced by Hoya-Schott Corporation). After that, as shown in FIG. 31C, a cured optical element 62' was removed from the mold 61. Thus, as shown in FIG. 31D, a diffractive optical element 64 was produced. Then, as shown in FIG. 31E, a Cr$_2$O$_5$ film 65 having a thickness of 4 μm was formed as an optical material on the optical element 62' at the degree of vacuum of 2×10$^{-4}$ Pa. Then, as shown in FIG. 31F, the surface of the Cr$_2$O$_5$ film 65 was polished to make a plane in which the number of Newton lines was 1 or less. After that, as shown in FIG. 31G, a glass plate 66 to which a silane coupling agent was applied was bonded onto the Cr$_2$O$_5$ film 65. Then, as shown in FIG. 31H, cured PMMA was dissolved by immersing the glass plate 66 in a methyl isobutyl ketone solvent. Accordingly, as shown in FIG. 31I, a diffractive optical element 67 made of Cr$_2$O$_5$ was produced. At this time, with respect to optical characteristics of the Cr$_2$O$_5$ as an optical material, $n_d$=2.218 and $v_d$=14.2.

On the other hand, as an optical material to be used for producing another optical element, a light curable resin 6 having optical characteristics of $n_d$=1.513 and $v_d$=51.0 was prepared, similarly to Example 1. As shown in FIGS. 3A to 3C, a diffractive optical element 8 was produced in the same manner as in Example 1.

Figure 32:
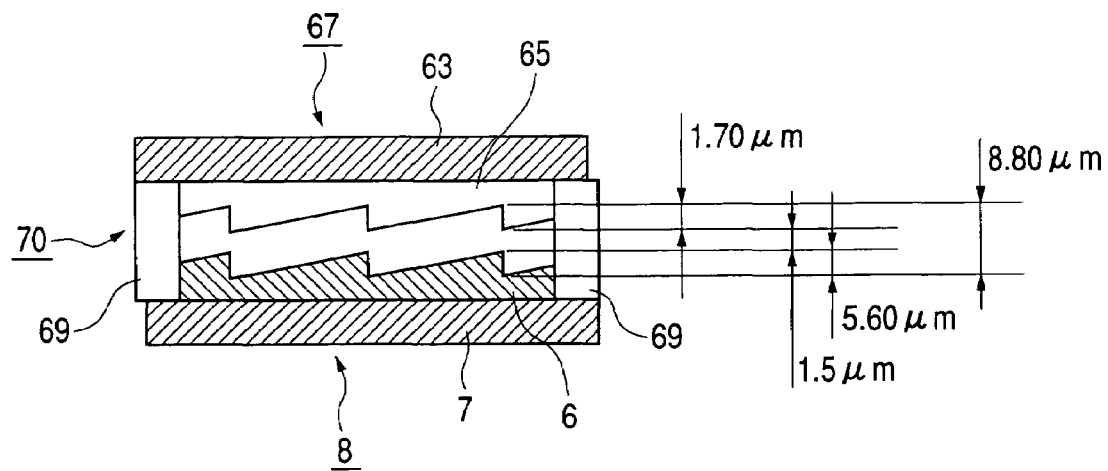
FIG. 32 is a sectional view showing a structure of a multilayer diffractive optical element according to Example 7.

Next, an antireflection film was formed on the diffraction surface of the diffractive optical element 67 and the diffraction surface of the diffractive optical element 8. Then, as shown in FIG. 32, the diffractive optical elements were combined with each other such that the diffraction gratings thereof were opposed to each other, thereby manufacturing a laminate type diffractive optical element 70. A spacer 69 determined an interval between the diffractive optical element 67 and the diffractive optical element 8. A pitch between respective adjacent gratings in the diffractive optical element 67 and the diffractive optical element 8 was 80 μm. An interval between troughs of the opposed diffraction gratings in the diffractive optical element 67 and the diffractive optical element 8 was 8.80 μm and an interval between crests thereof was 1.5 μm. A height of crests in the diffractive optical element 67 was 1.70 μm and a height of crests in the diffractive optical element 8 was 5.60 μm.

Figure 33:
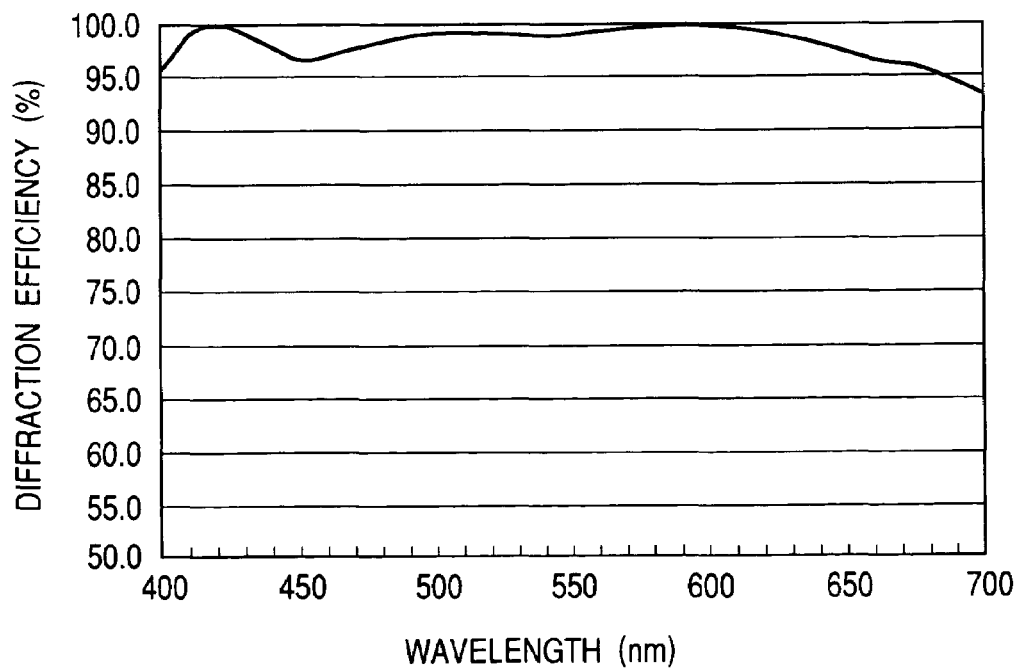
FIG. 33 is a graph showing a primary diffraction light intensity of the multilayer diffractive optical element according to Example 7.

FIG. 33 is a graph showing intensities in respective wavelengths (400 nm to 700 nm) of primary diffraction light at an incident angle of 0° with respect to the manufactured laminate type diffractive optical element 70. The abscissa indicates a wavelength and the ordinate indicates diffraction efficiency. In FIG. 33, the diffraction efficiency of the laminate type diffractive optical element 70 became 95% or more in a wavelength range of 400 nm to 700 nm which was the entire region of the use wavelength, showing a very preferable intensity-wavelength distribution.

Figure 34:
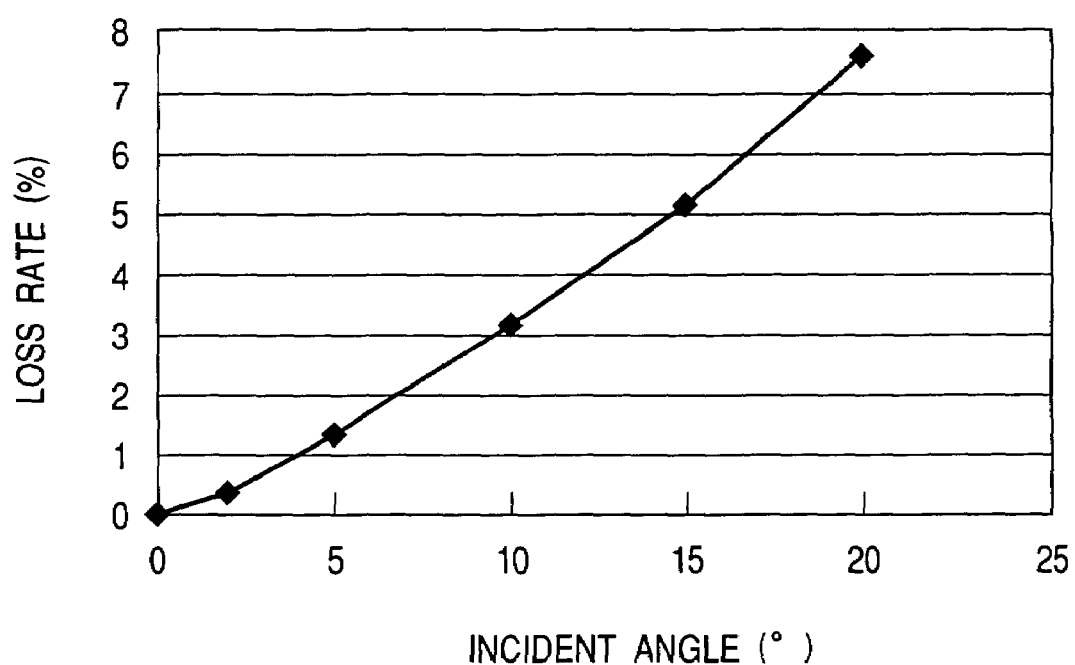
FIG. 34 is a graph showing a light loss rate of the multilayer diffractive optical element according to Example 7.

Also, FIG. 34 is a graph showing a reduction rate in an intensity of primary diffraction light at each incident angle in the case where an incident angle to the laminate type diffractive optical element 70 was changed. The abscissa indicates an incident angle and the ordinate indicates a light loss rate. In FIG. 34, the light loss rate becomes higher as the incident angle is increased. The light loss rate at the incident angle of 10° was 3.15%, which was not more than 3.40%. Accordingly, this value indicates a very preferable characteristic and it can be said that in the laminate type diffractive optical element 70, light beams are sufficiently concentrated on the specific order.

EXAMPLE 8

Figure 35A:
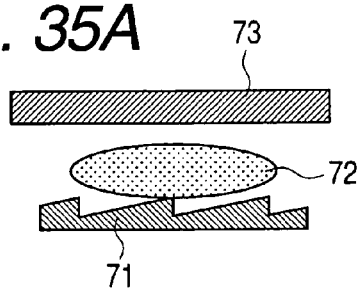
FIGS. 35A, 35B, 35C, 35D, 35E, 35F, 35G, 35H, and 35I are sectional views showing a process of forming an optical element according to Example 8.
Figure 35B:
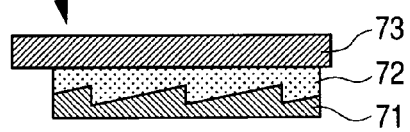
Figure 35C:
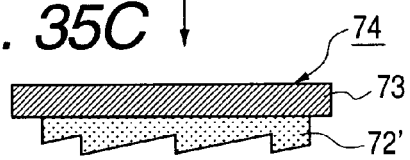
Figure 35D:
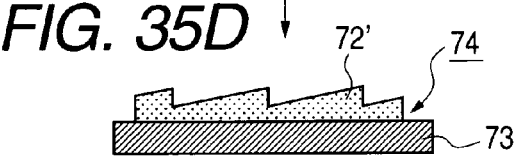
Figure 35E:
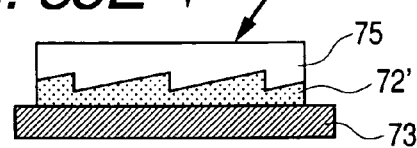
Figure 35F:
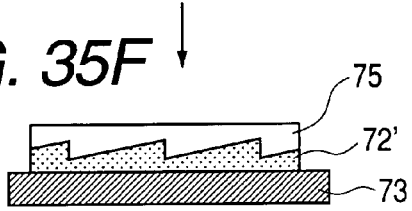
Figure 35G:
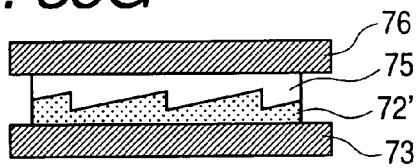
Figure 35H:
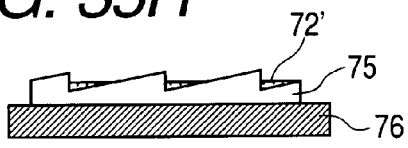
Figure 35I:
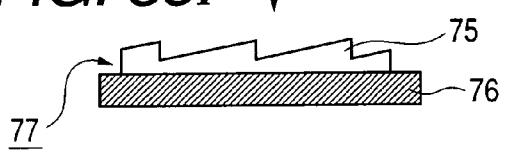
Figure 36:
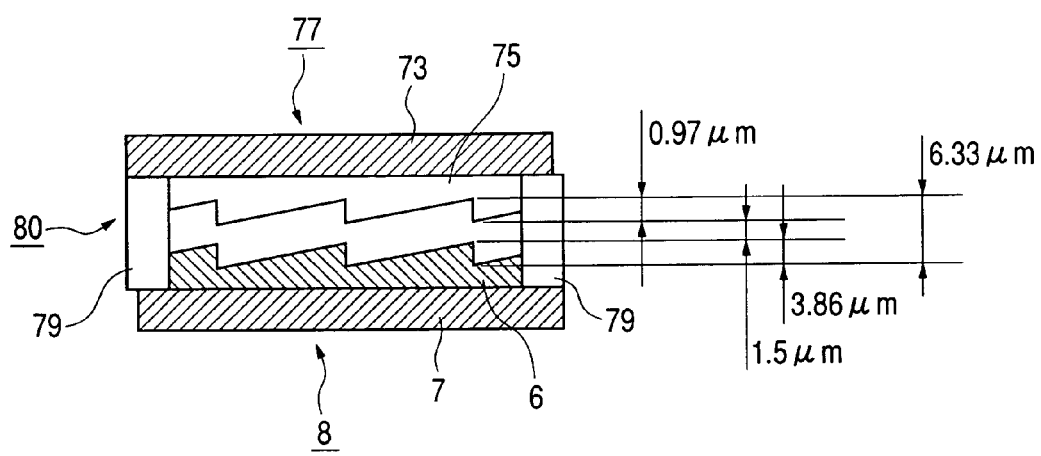
FIG. 36 is a sectional view showing a structure of a multilayer diffractive optical element according to Example 8.

Next, referring to FIGS. 3A to 3C, FIGS. 35A to 35I, FIG. 36, FIG. 37, and FIG. 38, a structure of a laminate type diffractive optical element and a manufacturing method thereof according to Example 8 will be described. First, methyl methacrylate to which 1-hydroxy-cyclohexyl-phenyl-ketone as a photoinitiator was added at a concentration of 1% was used to produce an optical raw material 72. Then, as shown in FIG. 35A, the optical raw material 72 was supplied to a mold 71 formed in a diffraction grating shape. Then, as shown in FIG. 35B, a glass (BK7) plate 73 was put on the optical raw material 72 and UV irradiation was conducted at 3000 mJ/cm$^2$ (100 mW/cm$^2$ and 30 seconds) by a UV exposure machine (EX250: produced by Hoya-Schott Corporation). After that, as shown in FIG. 35C, a cured optical element 52' was removed from the mold 51. Thus, as shown in FIG. 35D, a diffractive optical element 74 was produced. Then, as shown in FIG. 35E, a BaTio$_3$ film 75 having a thickness of 4 μm was formed as an optical material on the optical element 72' at the degree of vacuum of 2×10$^{-4}$ Pa. Then, as shown in FIG. 35F, the surface of the Nb$_2$O$_3$ film 75 was polished to make a plane in which the number of Newton lines was 1 or less. After that, as shown in FIG. 35G, a glass plate 76 to which a silane coupling agent was applied was bonded onto the BaTio₃ film 75. Then, as shown in FIG. 35H, cured PMMA was dissolved by immersing the glass plate 76 in a methyl isobutyl ketone solvent. Accordingly, as shown in FIG. 36I, a diffractive optical element 77 made of Nb₂O₃ was produced. At this time, with respect to optical characteristics of the BaTio₃ as an optical material, $n_d$=2.436 and $v_d$=12.4.

On the other hand, as an optical material to be used for producing another optical element, a light curable resin 6 having optical characteristics of $n_d$=1.513 and $v_d$=51.0 was prepared, similarly to Example 1. As shown in FIGS. 3A to 3C, a diffractive optical element 8 was produced in the same manner as in Example 1.

Next, an antireflection film was formed on the diffraction surface of the diffractive optical element 77 and the diffraction surface of the diffractive optical element 8. Then, as shown in FIG. 36, the diffractive optical elements were combined with each other such that the diffraction gratings thereof were opposed to each other, thereby manufacturing a laminate type diffractive optical element 80. A spacer 79 determined an interval between the diffractive optical element 77 and the diffractive optical element 8. A pitch between respective adjacent gratings in the diffractive optical element 77 and the diffractive optical element 8 was 80 μm. An interval between troughs of the opposed diffraction gratings in the diffractive optical element 77 and the diffractive optical element 8 was 6.33 μm and an interval between crests thereof was 1.5 μm. A height of crests in the diffractive optical element 77 was 0.97 μm and a height of crests in the diffractive optical element 8 was 3.86 μm.

Figure 37:
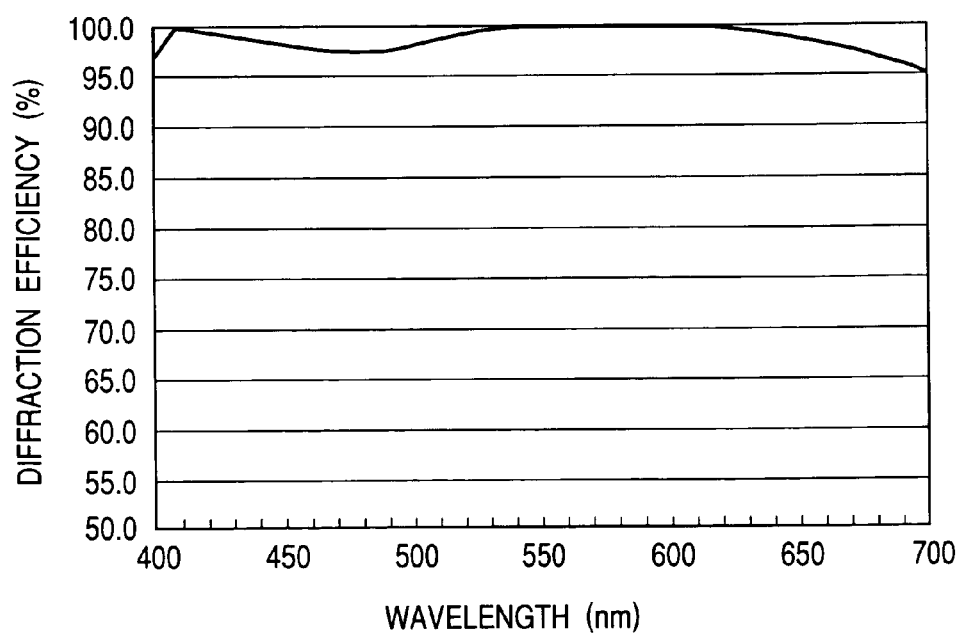
FIG. 37 is a graph showing a primary diffraction light intensity of the multilayer diffractive optical element according to Example 8.

FIG. 37 is a graph showing intensities in respective wavelengths (400 nm to 700 nm) of primary diffraction light at an incident angle of 0° with respect to the manufactured laminate type diffractive optical element 80. The abscissa indicates a wavelength and the ordinate indicates diffraction efficiency. In FIG. 37, the diffraction efficiency of the laminate type diffractive optical element 80 became 95% or more in a wavelength range of 400 nm to 700 nm which was the entire region of the use wavelength, showing a very preferable intensity-wavelength distribution.

Figure 38:
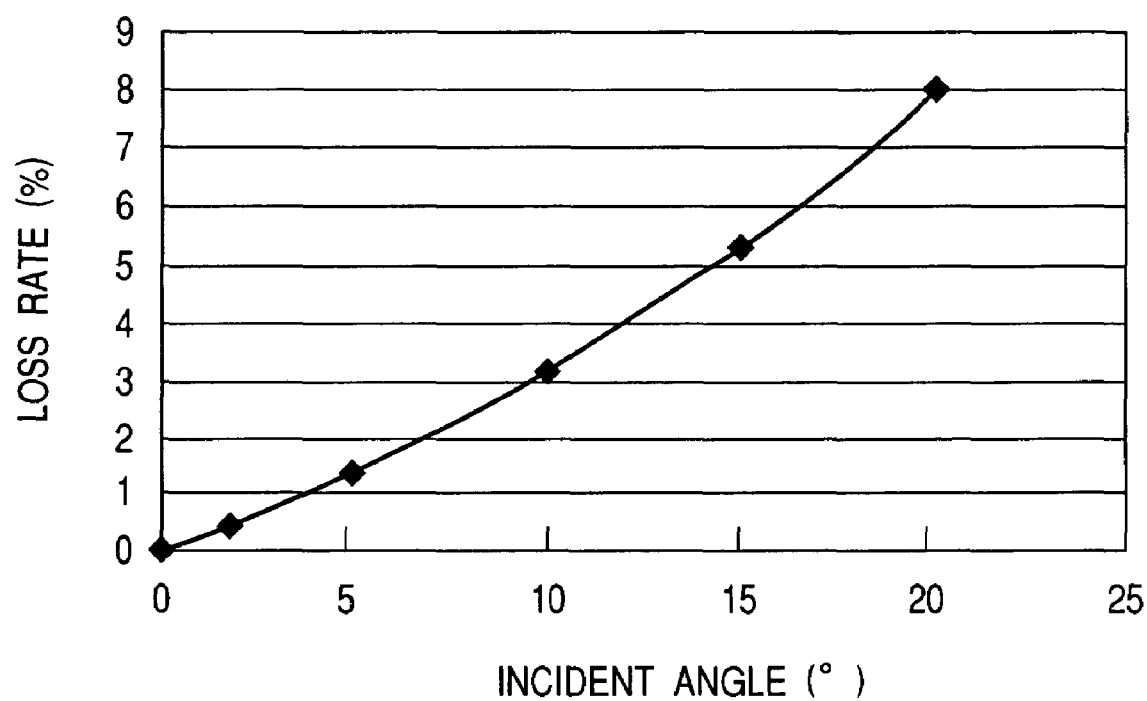
FIG. 38 is a graph showing a light loss rate of the multilayer diffractive optical element according to Example 8.

Also, FIG. 38 is a graph showing a reduction rate in an intensity of primary diffraction light at each incident angle in the case where an incident angle to the laminate type diffractive optical element 80 was changed. The abscissa indicates an incident angle and the ordinate indicates a light loss rate. In FIG. 38, the light loss rate becomes higher as the incident angle is increased. The light loss rate at the incident angle of 10° was 3.00%, which was not more than 3.40%. Accordingly, this value indicates a very preferable characteristic and it can be said that in the laminate type diffractive optical element 80, light beams are sufficiently concentrated on the specific order.

COMPARATIVE EXAMPLE 2

Next, referring to FIGS. 3A to 3C, FIGS. 39A to 39E, FIG. 40, FIG. 41 and FIG. 42, a structure of a laminate type diffractive optical element and a manufacturing method thereof according to Comparative Example 2 will be described. In Comparative Example 2, 13.8 g of an amorphous fluorine resin having a structure of a compound indicated by the following general formula (1) was added to 100 g of fluorine containing solvent in which TiO₂ fine particles having an average particle size of 10 nm were dispersed at 10 w %, thereby producing an optical raw material 212.

General formula (1):

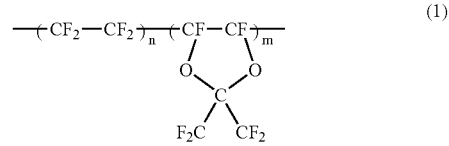

Figure 39A:
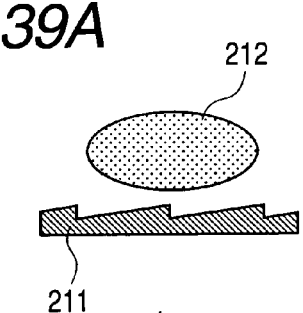
FIGS. 39A, 39B, 39C, 39D, and 39E are sectional views showing a process of forming an optical element according to Comparative Example 2.
Figure 39B:
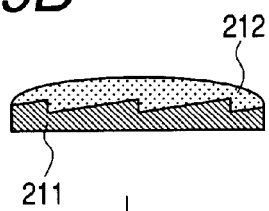
Figure 39C:
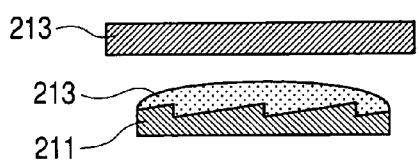
Figure 39D:
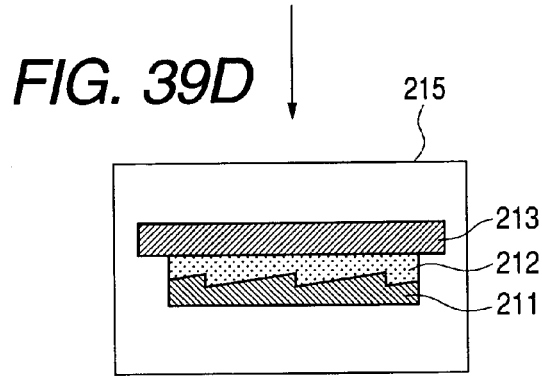
Figure 39E:
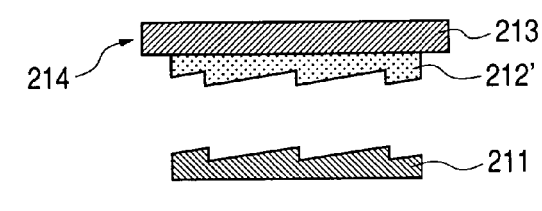

Next, as shown in FIG. 39A, the optical raw material 212 was poured into a mold 211 formed in a diffraction grating shape. Then, as shown in FIG. 39B, the optical raw material 212 was heated at 70° C. to evaporate a solvent component thereof at about 70%. After that, as shown in FIG. 39C, a glass (BK7) plate 213 is put on the optical raw material 212. Then, as shown in FIG. 39D, the glass plate 213 is placed in a vacuum chamber 215 and kept for 48 hours in a vacuum state of 2 hPa, while the entire mold 211 is kept at 70° C. After that, as shown in FIG. 39E, a cured optical element 212' is removed from the mold 211 to produce a diffractive optical element 214. Note that with respect to optical characteristics of the optical material composing the optical element 212', $n_d$=1.589 and $v_d$=15.0. The optical characteristics satisfy $v_d \leq 16$ but do not satisfy $n_d > -6.667 \times 10^{-3} v_d + 1.70$.

On the other hand, as an optical material to be used for producing another optical element, a light curable resin 6 having optical characteristics of $n_d$=1.513 and $v_d$=51.0 was prepared, similarly to Example 1. As shown in FIGS. 3A to 3C, a diffractive optical element 8 was produced in the same manner as in Example 1.

Figure 40:
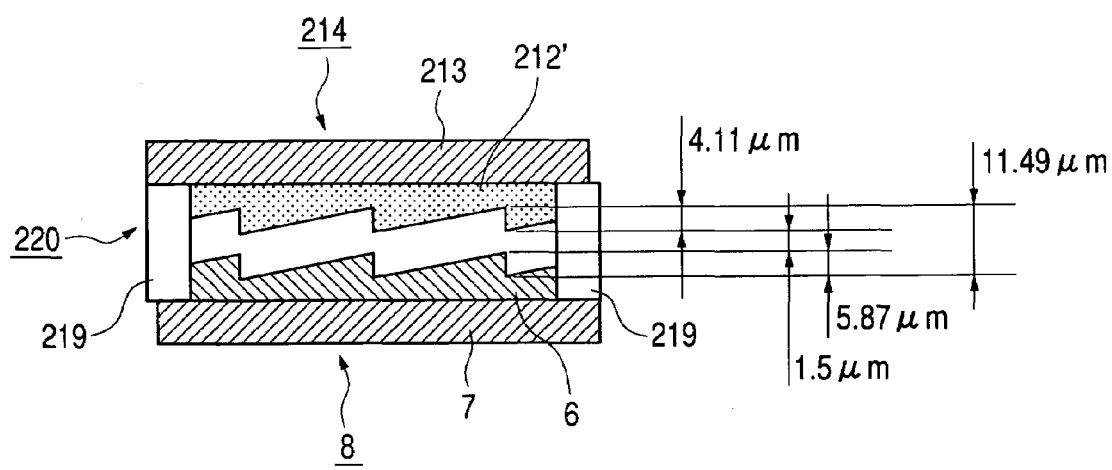
FIG. 40 is a sectional view showing a structure of a multilayer diffractive optical element according to Comparative Example 2.

Next, an antireflection film was formed on the diffractive optical element 214 and the diffractive optical element 8. Then, as shown in FIG. 40, the diffractive optical elements were combined with each other such that the diffraction gratings thereof were opposed to each other, thereby manufacturing a laminate type diffractive optical element 220. A spacer 219 determined an interval between the diffractive optical element 214 and the diffractive optical element 8. A pitch between respective adjacent gratings in the diffractive optical element 214 and the diffractive optical element 8 was 80.00 μm. An interval between troughs of the opposed diffraction gratings in the diffractive optical element 214 and the diffractive optical element 8 was 11.49 μm and an interval between crests thereof was 1.50 μm. A height of crests in the diffractive optical element 214 was 4.11 μm and a height of crests in the diffractive optical element 8 was 5.87 μm.

Figure 41:
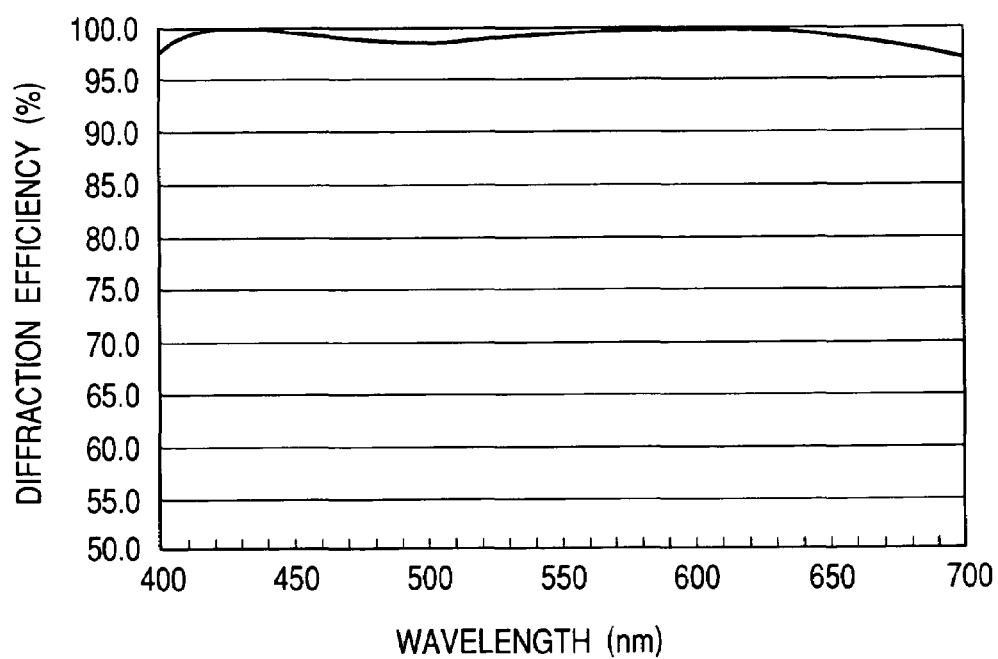
FIG. 41 is a graph showing a primary diffraction light intensity of the multilayer diffractive optical element according to Comparative Example 2.

FIG. 41 is a graph showing intensities in respective wavelengths (400 nm to 700 nm) of primary diffraction light at an incident angle of 0° with respect to the manufactured laminate type diffractive optical element 220. The abscissa indicates a wavelength and the ordinate indicates diffraction efficiency. In FIG. 6, the diffraction efficiency of the laminate type diffractive optical element 220 became 95% or more in a wavelength range of 400 nm to 700 nm which was the entire region of the use wavelength, showing a very preferable intensity-wavelength distribution.

Figure 42:
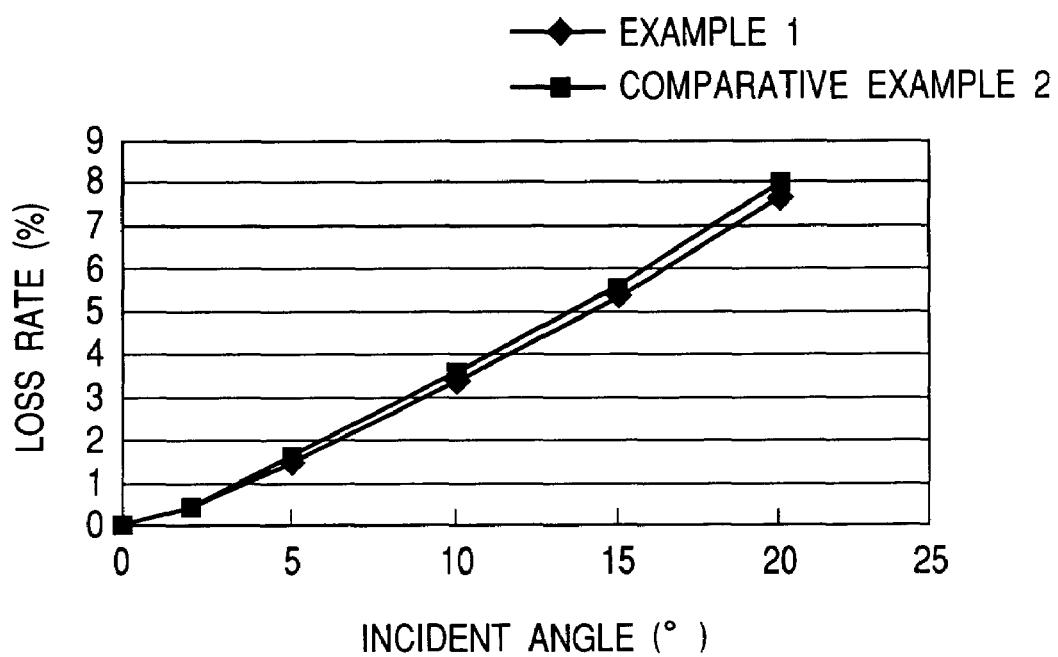
FIG. 42 is a graph showing a light loss rate of the multilayer diffractive optical element according to Comparative Example 2.

On the other hand, FIG. 42 is a graph showing a reduction rate in an intensity of primary diffraction light at each incident angle in the case where an incident angle to the laminate type diffractive optical element 220 was changed.

The abscissa indicates an incident angle and the ordinate indicates a light loss rate. Note that values shown in FIG. 6 in Example 1 are also shown for comparison. In FIG. 42, the light loss rate becomes higher as the incident angle is increased. The light loss rate at the incident angle of 10° was 3.48%. This value was more than 3.40% which was a required light loss rate value. Accordingly, it cannot be said that the laminate type diffractive optical element 220 is the laminate type diffractive optical element in which light beams are sufficiently concentrated on the specific order.

Next, Table 1 shows light loss rates at the incident angle of 10° in Examples 1 to 8 and Comparative Examples 1 and 2 as described above. In Table 1, a condition 1 is $n_d > -6.667 \times 10^{-3} v_d + 1.70$ and a condition 2 is $v_d \leq 16$. In the case where the respective optical materials satisfy the conditions, a mark "o" is indicated. If the respective optical materials do not satisfy the conditions, a mark "x" is indicated. The required light loss rate at the incident angle of 10° for the laminate type diffractive optical is 3.40% or less. Therefore, the determination of good or bad depends on whether or not the light loss rate is 3.40% or less.

TABLE 1

|  | Condition 1 | Condition 2 | Light loss rate at the incident angle of 10° | Good or Bad |
|---|---|---|---|---|
| Example 1 | o | o | 3.27% | o |
| Example 2 | o | o | 3.40% | o |
| Example 3 | o | o | 3.40% | o |
| Example 4 | o | o | 3.24% | o |
| Example 5 | o | o | 3.06% | o |
| Example 6 | o | o | 3.15% | o |
| Example 7 | o | o | 3.15% | o |
| Example 8 | o | o | 3.00% | o |
| Comparative Example 1 | o | x | 3.52% | x |
| Comparative Example 2 | x | o | 3.48% | x |

As is apparent from Table 1, in the case of the optical materials in Examples 1 to 8, the light loss rate at the incident angle of 10° is smaller and the light beams are concentrated on the specific order, as compared with the optical elements in Comparative Examples 1 and 2. That is, unless both the condition 1 of $n_d > -6.667 \times 10^{-3} v_d + 1.70$ and the condition 2 of $v_d \leq 16$ are satisfied, a desirable light loss rate cannot be achieved and light beams cannot be concentrated on the specific order.

Figure 43:
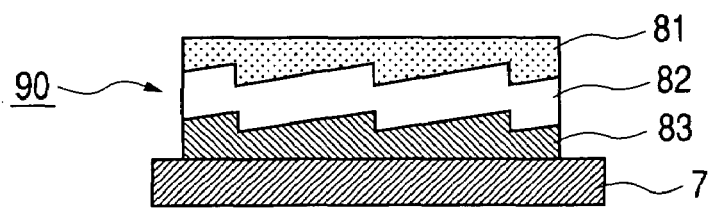
FIG. 43 is a sectional view of a multilayer diffractive optical element with three layers.

Additionally, the two-layer type diffractive optical element in which the two diffractive optical elements are disposed such that the diffraction surfaces thereof are opposed to each other is described in this embodiment. However, the present invention is not limited to this and can be used for a laminate type diffractive optical element, which three or more diffractive optical elements or three or more layers are laminated and disposed. FIG. 43 is a sectional view showing an example of a laminate type diffractive optical element 90 with three layers. In FIG. 43, a first layer 81, a second layer 82, and a third layer 83 are formed on a glass substrate 7. The first layer 81 is made of the optical material that satisfies $n_d > -6.667 \times 10^{-3} v_d + 1.70$ and $v_d \leq 16$ as indicated in Examples 1 to 8 described above. The optical materials that compose the second layer 82 and the third layer 83 respectively have an Abbe number larger than that of the optical material composing the first layer 81. By increasing the number of layers of a diffractive optical element, an optical element having a more complex function can be obtained.

It is not necessarily needed that the optical material that satisfies $n_d > -1.667 \times 10^{-3} v_d + 1.770$ and $v_d \leq 16$ forms the first layer. It is needed that the optical material forms at least one layer of the laminate type diffractive optical element 90.

Second Embodiment

Figure 44:
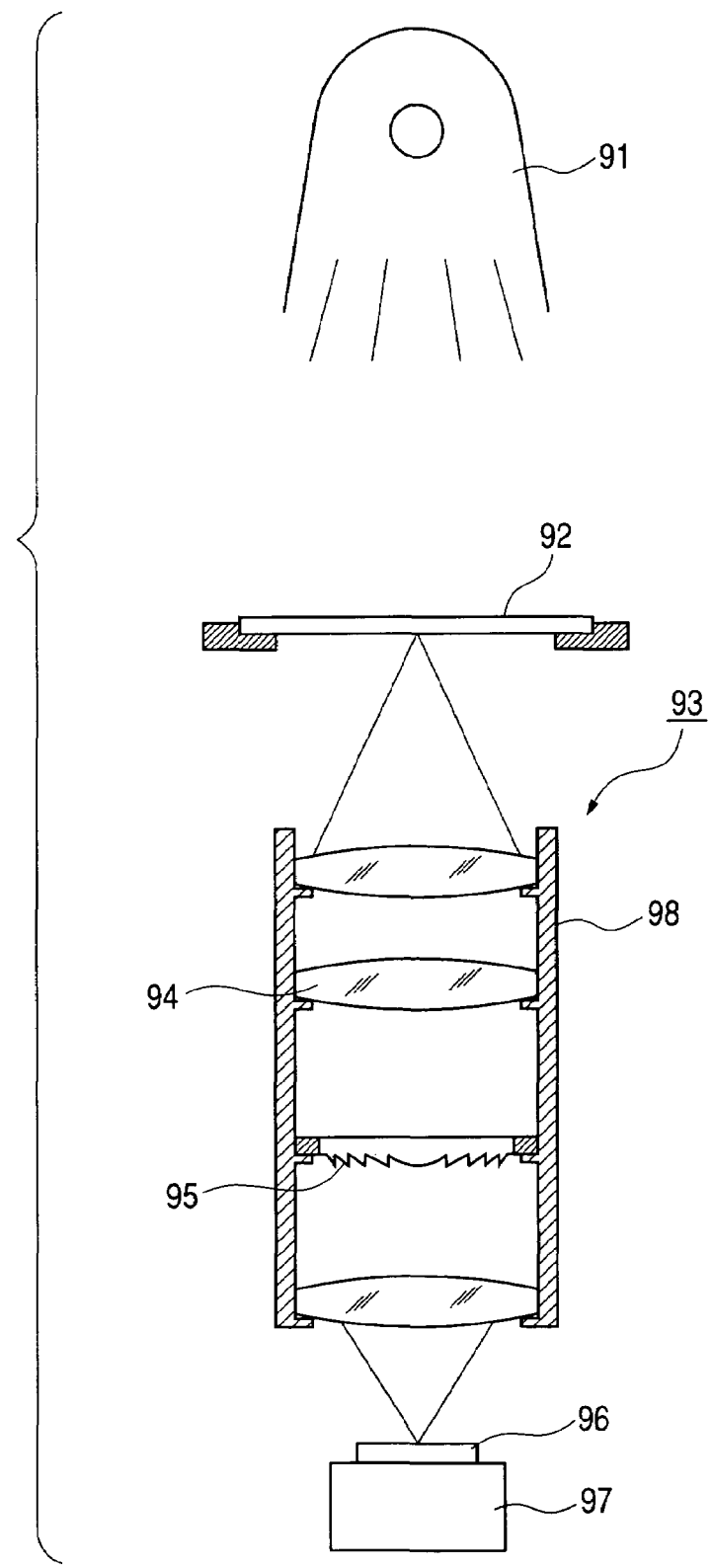
FIG. 44 is a schematic view of a projection optical system according to Second Embodiment.

In Second Embodiment, the diffractive optical element indicated in First Embodiment described above is used for a projection optical system. FIG. 44 shows a projection optical system 93. In FIG. 44, the projection optical system 93 includes a light source 91, a reticle 92, a lens barrel 98, a lens 94, and a diffractive optical element 95 of the present invention. A wafer 96 is placed on a wafer stage 97.

The diffractive optical element 95 is provided so as to correct the chromatic aberration of the lens 94. The wafer 96 is positioned at a preferable position by the wafer stage 97. A height of the wafer is adjusted to a focal position by a focal detecting unit which is not shown. Here, in some cases, the reticle 92 is aligned to a mark on a lower layer, which has already been exposed onto the wafer, by a detection system which is not shown. After focusing and alignment are completed, a shutter (not shown) is opened and the reticle is illuminated with illumination light from the light source 91. Accordingly, a circuit pattern on the reticle 92 is projected for exposure to a resist on the wafer 96 by the projection optical system 93.

The thus exposed wafer 96 becomes a plurality of devices through a development processing step, an etching step, and the like, which are known. The optical system having the optical element according to the present invention can be similarly applied to an optical device for image formation, an illumination apparatus for illumination, and the like. In addition, an optical element having a desirable shape, other than the diffractive optical element, can be used as the optical element of the present invention.

Third Embodiment

Figure 45:
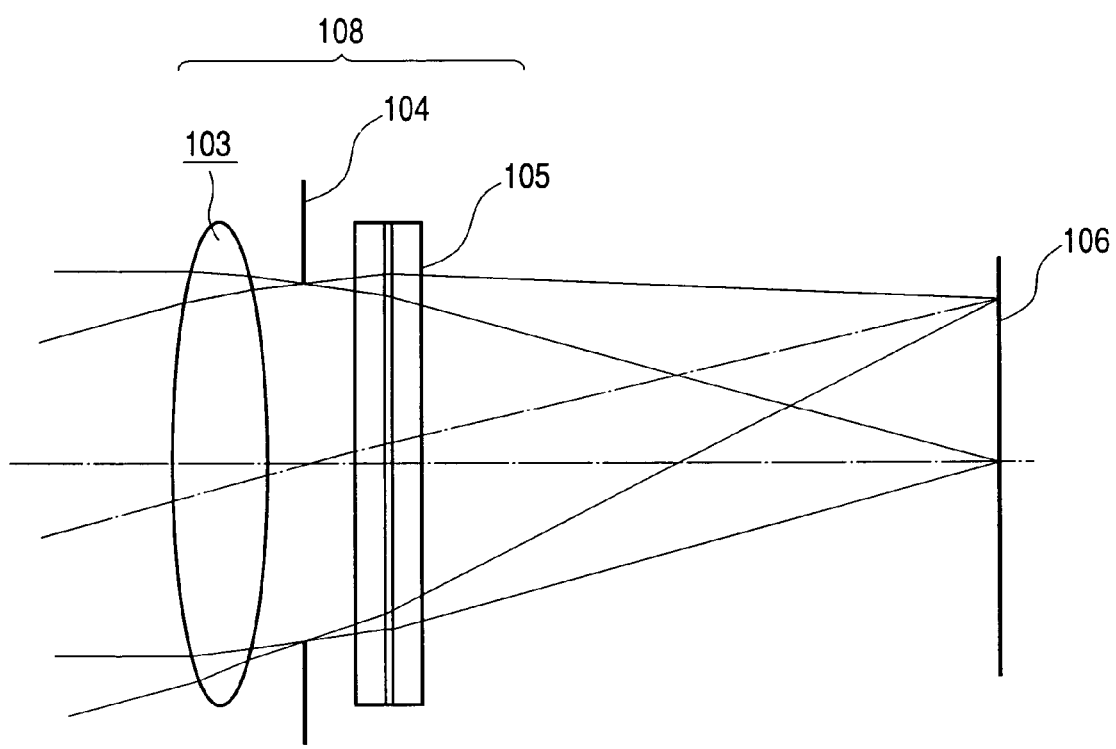
FIG. 45 is a schematic view of a photographing optical system according to Third Embodiment.

In Third Embodiment, the diffractive optical element indicated in First Embodiment described above is used for a photographing optical system. FIG. 45 shows a photographing optical system. In FIG. 45, a photographing optical system 108 includes at least one diffractive optical element 105, at least one refraction optical element 103, and at least one diaphragm 104. FIG. 45 shows a state in which light fluxes from an object, which are incident into the photographing optical system 108, are imaged onto a light receiving portion (photographing unit) 106.

With respect to diffraction light of the design order in the diffractive optical element 105, aberration is corrected so as to obtain a preferable optical performance in a specific wavelength region by a combination with the refraction optical element 103. The light receiving portion 106 is composed of a plurality of light receiving members having different spectral sensitivities and constructed such that a color image is obtained by synthesizing images from the light receiving members having different spectral sensitivities. Note that a CCD, a silver halide film, a photosensitive member, or the like is generally used as the light receiving portion 106. The light receiving portion 106 may be a human eye.

According to the present invention, the optical element in which the relationship between the refraction index $n_d$ and the Abbe number $v_d$ with respect to the "d" line is $nd > -6.667 \times 10^{-3} v_d + 1.70$ and the Abbe number $v_d$ satisfies $v_d \leq 16$ is produced. Accordingly, the optical element in which the diffraction efficiency in each use wavelength region within the entire visible region is preferable can be provided. In addition, light beams of the specific order (design order) are sufficiently concentrated in the entire use wavelength region, so that the intensity of diffraction light of a diffraction order can be increased. Thus, it can be prevented that flare light in which the light beam other than the design order is imaged in a location different from an imaging location of the light beam of the design order is caused.

What is claimed is:

1. An optical element comprising:
   a polymer comprising polyvinylcarbazole containing inorganic fine particles comprising at least one inorganic substance selected from the group consisting of $TiO_2$ fine particles, $Nb_2O_5$ fine particles, $Cr_2O_3$ fine particles, and $BaTiO_3$ fine particles,
   wherein the optical element satisfies the following conditions:
   $n_d > -6.667 \times 10^{-3} v_d + 1.70$, where a refraction index with respect to a d-line is $n_d$ and an Abbe number with respect to the d-line is $v_d$; and
   $v_d \leq 16$.

2. The optical element according to claim 1, wherein the inorganic fine particles have a particle size of from 2 nm to 100 nm.

3. The optical element according to claim 1, wherein the optical element is formed into a desirable shape by curing.

4. The optical element according to claim 3, wherein one surface of the optical element comprises a diffraction surface with a diffracting shape.

5. A laminate type diffractive optical element comprising:
   a first diffractive optical element; and
   a second diffractive optical element,
   wherein one surface of the first diffractive optical element is a diffraction surface with a diffracting shape,
   wherein the first diffractive optical element comprises polyvinylcarbazole containing inorganic fine particles comprising at least one inorganic substance selected from the group consisting of $TiO_2$ fine particles, $Nb_2O_5$ fine particles, $Cr_2O_3$ fine particles, and $BaTiO_3$ fine particles,
   wherein the first diffractive optical element satisfies the following conditions:
   $n_d > -6.667 \times 10^{-3} v_d + 1.70$, Where a refraction index with respect to a d-line is $n_d$ and an Abbe number with respect to the d-line is $v_d$; and
   $v_d \leq 16$,
   wherein the second diffractive optical element has the Abbe number larger than that of the first diffractive optical element, and
   wherein one surface of the second diffractive optical element is a diffraction surface with a diffracting shape.

6. The laminate type diffractive optical element according to claim 5, wherein the diffraction surface of the first diffractive optical element and the diffraction surface of the second diffractive optical element are opposed to each other.

7. The laminate type diffractive optical element according to claim 5, wherein the inorganic fine particle have a particle size of from 2 nm to 100 nm.

8. A projection optical system for imaging a given object using a laminate type diffractive optical element of claim 5.

9. A photographing optical system for projecting light to a given object using a laminate type diffractive optical element of claim 5.

* * * * *

UNITED STATES PATENT AND TRADEMARK OFFICE
CERTIFICATE OF CORRECTION

| | |
|---|---|
| PATENT NO. | : 7,046,445 B2 |
| APPLICATION NO. | : 10/649632 |
| DATED | : May 16, 2006 |
| INVENTOR(S) | : Hideo Ukuda |

It is certified that error appears in the above-identified patent and that said Letters Patent is hereby corrected as shown below:

COLUMN 7

Line 41, "TiO2 particles" should read --$TiO_2$ particles--.

COLUMN 13

Line 19, "TiO2 film" should read --$TiO_2$ film--; and
Line 31, "TiO2" should read --$TiO_2$--.

COLUMN 16

Line 62, "BaTio$_3$ film" should read --$BaTiO_3$ film--.

COLUMN 17

Line 3, "BaTio$_3$ film" should read --$BaTiO_3$ film--; and
Line 8, "BaTio$_3$ film" should read --$BaTiO_3$ film--.

COLUMN 22

Line 11, "Where" should read --where--; and
Line 25 "particle" (first occurrence) should read --particles--.

Signed and Sealed this

Twenty-eighth Day of November, 2006

JON W. DUDAS
*Director of the United States Patent and Trademark Office*